US010305298B2

(12) United States Patent
Kristensen

(10) Patent No.: US 10,305,298 B2
(45) Date of Patent: May 28, 2019

(54) METHOD AND APPARATUS FOR CREATING A DYNAMICALLY RECONFIGURABLE ENERGY STORAGE DEVICE

(71) Applicant: GLX Power Systems Inc., Cleveland, OH (US)

(72) Inventor: Kent Kristensen, Chagrin Falls, OH (US)

(73) Assignee: GLX Power Systems, Inc., Chagrin Falls, OH (US)

( * ) Notice: Subject to any disclaimer, the term of this patent is extended or adjusted under 35 U.S.C. 154(b) by 0 days.

(21) Appl. No.: 16/126,675

(22) Filed: Sep. 10, 2018

(65) Prior Publication Data

US 2019/0103750 A1 Apr. 4, 2019

Related U.S. Application Data

(63) Continuation-in-part of application No. 15/269,325, filed on Sep. 19, 2016, now Pat. No. 10,074,997, which is a continuation-in-part of application No. 14/216,436, filed on Mar. 17, 2014, now Pat. No. 9,450,274.

(51) Int. Cl.
*H02J 7/00* (2006.01)
*H02J 7/34* (2006.01)

(52) U.S. Cl.
CPC .......... *H02J 7/0026* (2013.01); *H02J 7/0016* (2013.01); *H02J 7/0024* (2013.01); *H02J 7/345* (2013.01)

(58) Field of Classification Search
CPC ..................................................... H02J 7/0021
USPC ........................................................ 320/103
See application file for complete search history.

(56) References Cited

U.S. PATENT DOCUMENTS

| 7,274,170 | B2 * | 9/2007 | Benckenstein, Jr. | . H02J 7/0016 320/119 |
| 7,279,867 | B2 * | 10/2007 | Benckenstein, Jr. | . H02J 7/0016 320/112 |
| 9,088,178 | B2 * | 7/2015 | Adest | ...................... H02J 1/102 |
| 9,450,274 | B2 * | 9/2016 | Vo | ...................... H01M 10/4257 |
| 9,806,318 | B2 * | 10/2017 | Holtappels | ............ H01M 2/206 |
| 2014/0015488 | A1 * | 1/2014 | Despesse | ............ H01M 10/425 320/122 |

* cited by examiner

*Primary Examiner* — Suchin Parihar
(74) *Attorney, Agent, or Firm* — George W. Moxon, II; Brian P. Harrod

(57) ABSTRACT

A reconfigurable energy storage system comprising energy modules comprising interconnected circuits, each circuit having at least two terminals, which can function as input or output terminals; an energy storage unit with a positive and a negative terminal, either of which can be interposed between the terminals; a switch connected to the storage unit, and where the switch module provides parallel, series, and/or bypass connectivity for and enables the ability to reverse polarity in the storage unit, and enables the ability to simultaneously charge and discharge storage units within the system; and a control unit that monitors an operational state of the energy storage unit in the energy modules and controls the switches, to bypass, connect the storage unit in parallel, series, and/or change the polarity of the storage unit, wherein the control unit determines a number of storage units available for use from the storage units in the circuits.

20 Claims, 28 Drawing Sheets

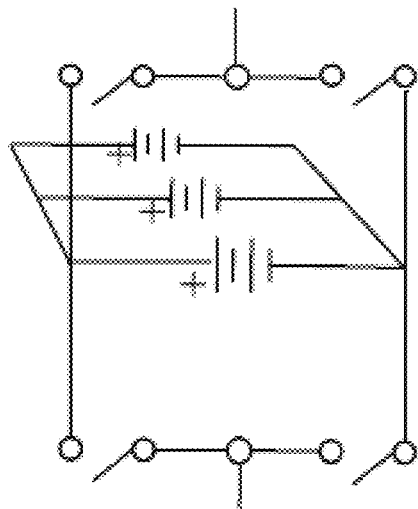
Fig.10
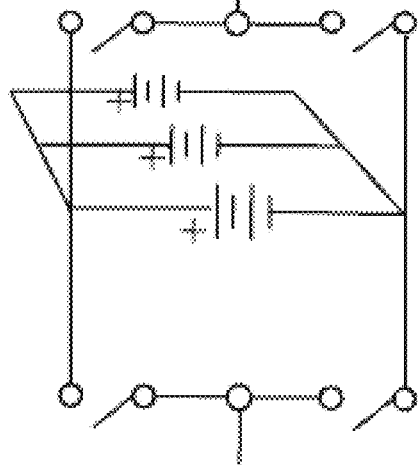
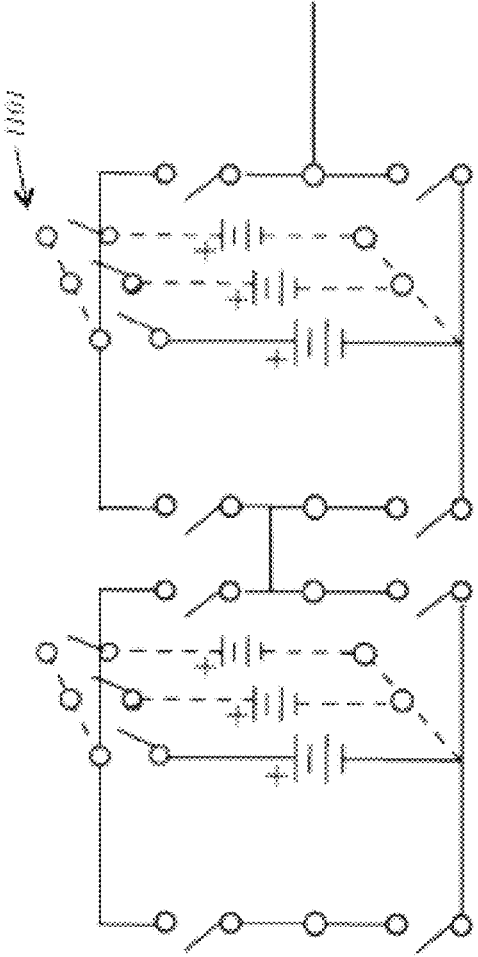
Fig.11

METHOD AND APPARATUS FOR CREATING A DYNAMICALLY RECONFIGURABLE ENERGY STORAGE DEVICE

CROSS REFERENCE TO RELATED APPLICATIONS

This application is a continuation-in-part of, and claims the benefit of, U.S. patent application Ser. No. 15/269,325, filed Sep. 19, 2016, which is entitled "Method And Apparatus For Creating A Dynamically Reconfigurable Energy Storage Device," which is a continuation-in-part of, and claims the benefit of, U.S. patent application Ser. No. 14/216,436, filed Mar. 17, 2014, which is entitled "Method And Apparatus For Creating A Dynamically Reconfigurable Energy Storage Device" and issued Sep. 20, 2016 as U.S. Pat. No. 9,450,274, all of which are incorporated herein by reference.

BACKGROUND OF THE INVENTION

The present invention is related to a power management system for use in connection with battery cells, which allow the cells and batteries to be turned into variable energy storage sources, which can be used in devices, such as for example, electric vehicles or grid storage. More specifically, the present invention is a platform, which uses a switch nodule having 2n+2 switches, where n is 1 or more and based upon the number of energy modules, and includes switch modules based upon inverted H-Bridge circuitry, as well as a switch module having an alternating polarity, which will be discussed further later, in combination with software which allows for real-time monitoring, management, control, and configuration of energy modules.

Battery-Powered Applications include either an AC-DC converter that converts an AC source such as a 120V, 60 Hz wall outlet, to the appropriate DC level to charge the battery, or a DC-DC converter to convert a DC power source such as a solar panel, to appropriate level to charge the battery pack. Battery powered applications also include a converter/inverter to provide power to the load application, where load may be either DC, such as a DC motor in an electric vehicle, or AC like an AC motor for a fan. The DC-AC inverter has to be adapted to compensate for voltage variations occurring in the DC supply voltage. Such voltage variations may occur due to discharging the battery cells during operation. Often, a DC-DC converter is connected between the battery arrangement and the DC-AC inverter. The DC-DC converter is adapted to provide a constant DC supply voltage to the DC-AC inverter, and therefore compensates for voltage variations in the voltage provided by the battery arrangement. Unfortunately, providing the DC-DC converter adds to the complexity of the system. DC-DC converters may also provide unnecessary power losses and/or additional overhead requirements in the balance of system.

The battery arrangement includes a number of battery cells, which are rechargeable cells, such as lithium-ion cells. These cells are connected such that they share a common ground. A number of battery cells are connected in series or parallel, where a DC charging voltage is provided by this series arrangement. High voltage batteries also may involve connections of many cells or cell modules for other purposes. For example, use of high voltage batteries include battery cell arrays for aerospace/spacecraft applications, telecommunication power supplies, computer power supplies, uninterruptible power supplies, electric utility energy storage, commercial applications, solar energy storage, wind energy storage, and the like. High voltage batteries may be of different types including lithium-ion cells, fuel cells, other electrochemical cells, and the like.

Also, most types of accumulator cells, such as lithium-ions cells, should not be discharged below a lower voltage limit or charged above a higher voltage limit, in order to prevent degradation or damage. In order to prevent improper discharging or charging of individual accumulator cells, cell-balancing schemes are applied. Such balancing schemes involve discharging more highly charged cells to the benefit of less charged cells, or in the case of charging, charging more lowly charged cells to the benefit of high charged cells. Circuit arrangements for performing cell balancing schemes are required in addition to the DC-AC inverter and charger.

It is very desirable to simplify battery management systems and to reduce aging and extend the life of battery cells as much as possible to reduce the cost of replacing the batteries. Further, there is a need in the art for a system to carefully control and optimize the re-charging of battery cells and any other electrical storage devices in a manner to mitigate damage during charging and extend the life of the storage device. Similarly, these same requirements apply to discharge and the interaction of both charging and discharging. Another concern associated with cell life and battery management systems is parasitic loss, internal discharge and unnecessary power level overheads required to serve certain applications.

In prior art systems, cell monitoring and balancing are achieved either by including complex electronic circuitry at each cell, or electrical connectors with many contacts to allow external circuitry to monitor and balance the cells. Complicated circuitry at each cell is inherently less reliable. If many connections are required, the connectors present electrical shock safety issues. If the connectors are heavy, then they may be unsuitable for aerospace, spacecraft, and other portable applications.

For some applications, it may be desirable to provide separate battery system components such as an external charger and an external cell charge measurement subsystem. To provide the capability to monitor individual battery cells, a multi-pin connector and additional wiring or sense lines on the battery is required. In large high voltage batteries, such a connector has several disadvantages. The connector needs at least one pin per cell. Since the battery can produce high voltages, the sense lines need a safety disconnect or electrical isolation to avoid exposing ground personnel or crew to high voltages when the connector is used. Since the battery can produce high currents, the sense lines may also need some sort of fusing or other wire protection as well.

Addressing safety concerns, regulatory compliance and emergency management procedures may also require additional monitoring, control and safety switches introducing additional componentry, failure points and cost.

Patents showing efforts to solve the problems with managing battery charging and systems include U.S. Pat. No. 7,148,654, issued Dec. 12, 2006, to Burany et al, which discloses a system and method for monitoring cell voltages for a plurality of electrochemical cells connected in series forming a cell stack. The method includes dividing the cells into at least two cell groups, measuring the voltage across each cell group and estimating the minimum cell voltage for each group based on the average cell stack voltage and an estimated number of deficient cells in each group. The lowest minimum cell voltage for the entire cell stack is then determined.

U.S. Pat. No. 7,081,737, issued Jul. 25, 2006, to Liu et al, discloses a monitoring circuit for monitoring a voltage level from each of a plurality of battery cells of a battery pack includes an analog to digital converter (ADC) and a processor. The ADC is configured to accept an analog voltage signal from each of the plurality of battery cells and convert each analog voltage signal to a digital signal representative of an accurate voltage level of each battery cell. The processor receives such signals and provides a safety alert signal based on at least one of the signals. The ADC resolution may be adjustable. A balancing circuit provides a balancing signal if at least two of the digital signals indicate a voltage difference between two cells is greater than a battery cell balance threshold. An electronic device including such monitoring and balancing circuits is also provided.

U.S. Pat. No. 6,983,212, issued Jan. 3, 2006, to Burns, discloses a battery management system for control of individual cells in a battery string. The battery management system includes a charger, a voltmeter, a selection circuit and a microprocessor. Under control of the microprocessor, the selection circuit connects each cell of the battery String to the charger and voltmeter. Information relating to battery performance is recorded and analyzed. The analysis depends upon the conditions under which the battery is operating. By monitoring the battery performance under different conditions, problems with individual cells can be determined and corrected.

U.S. Pat. No. 6,844,703, issued Jan. 18, 2005, to Canter, discloses a battery cell balancing system for a battery having a plurality of cells. The system includes a power supply and a plurality of transformer/rectifier circuits electrically coupled to the cells. Preferential charging occurs for a cell with the lowest state of charge. At least one current limiting device is electrically coupled to the transformer/rectifier circuits and the power supply. The current limiting device buffers a source voltage from a reflected voltage of at least one of the plurality of cells).

U.S. Pat. No. 6,803,678, issued Oct. 12, 2004, to Gottlieb et al, discloses a UPS system for providing backup power to a load and includes: a power input; multiple batteries; multiple battery housings, each containing one of the batteries, the batteries being coupled in parallel; multiple battery-monitor processors, each monitor being disposed in a respective one of the battery housings and coupled to the corresponding battery; a UPS processor coupled, and configured, to receive monitor data from the plurality of battery-monitor processors; a UPS-processor housing containing the UPS processor and being displaced from the battery housings; and a power output coupled and configured to selectively provide power from one of the power input and the batteries.

U.S. Pat. No. 6,664,762 issued Dec. 16, 2003, to Kutkut, discloses a battery charger for charging high voltage battery Strings that includes a DC-to-AC converter, which drives the primary of a transformer having multiple secondaries. Each secondary winding has a corresponding output stage formed of a rectification circuit, output inductor, and output capacitor. The output terminals of the output stages are connectable either in parallel or series. In either configuration, inductor current and capacitor voltage automatically balance among the output stage circuits. A controller normally regulates output terminal voltage by operating in voltage mode, but limits current by operating in a current mode when the average of inductor currents exceeds a specified limit. Reconfiguration from parallel to series, or vice versa, is obtained physical reconnection of the output stage terminals and adjustment of a single voltage feedback scaling factor. Connecting the output stages in series to produce a high voltage output reduces voltage stresses on the rectification circuits and enables use of Schottky diodes to avoid reverse recovery problems.

U.S. Pat. No. 6,583,603, issued Jun. 24, 2003, to Baldwin, discloses an apparatus and method for controllably charging and discharging individual battery cells or groups of battery cells in a string of batteries employed as a back-up power supply. The apparatus includes battery supply modules for at least partially isolating battery strings from the load bus and primary power supply. The partial isolation is effected by a switching network including two controlled switches arranged in parallel to selectively isolate the string of batteries. In certain disclosed embodiments, one of the controlled switches is turned on to connect the string of batteries to the load bus until the other controlled switch closes. The system includes a main power supply that supplies a power bus to a regulator in each battery supply module, which is used for charging the battery string, and a discharge bus to each battery supply module for discharging the batteries.

U.S. Pat. No. 6,268,711 issued Jul. 31, 2001, to Bearfield, discloses a battery manager that provides the ability to switch multiple batteries, battery cells, or other forms of power sources to power external devices individually, in series, and/or in parallel. The device is typically electronic based and consists of voltage level detecting circuits for comparing each power source to a reference voltage, FET control logic for controlling the switching matrix, and a switching matrix which accomplishes the required configuration of power sources to provide an output power source. The invention can be extended with the addition of an output power monitor, DC/DC converter, and control signals that augment internal switching. Depending upon implementation requirements, the battery manager can be in the form of a single integrated circuit.

U.S. Pat. No. 6,181,103 issued Jan. 30, 2001, to Chen, discloses a system converting a smart battery pack into a removable and data accessible (RADA) battery pack and an intelligent power management algorithm embedded in the host computer. The RADA battery pack contains a temperature sensor, a display unit, and a memory (EEPROM). Peripherals mounted on the host computer side contain a control unit, a charging circuit, a load circuit, a voltage divider, a current detector, a temperature control circuit, and a data bus are used to cope with the removal and data access operation for the AICPM system. The removable and data-accessible battery pack utilizes the functions provided by this invention to read, update, and record data about the battery pack, such as number of times used, remaining capacity, usable time, and nominal capacity. It also stores these data in the EEPROM of the RADA battery pack so that when the battery pack is used next time, the AICPM system can read out these data from the EEPROM and use them as the battery pack new information.

U.S. Pat. No. 6,031,354 issued Feb. 29, 2000, to Wiley et al, discloses an on-line battery management and monitoring system and method for monitoring a plurality of battery cells identifies and computes individual cell and battery bank operating parameters. The system comprises a central monitoring station to which a plurality of controllers is connected, each controller having a plurality of battery cells which it monitors. Features of the invention include the following: display of measurement and alarm condition data for each of the battery cells connected to each of the controllers; color-coded display of data for a battery cell, the display color being dependent upon the condition of the battery; performance of data analysis and initiation of necessary maintenance requests; operation of the controllers in an automatic local mode, automatic remote mode, or maintenance mode; provision for periodic calls from the controllers to the central monitoring station; and generation of red alarm calls, yellow alarm calls, downscale alarm calls, and diagnostic calls between the central monitoring station and the controllers.

U.S. Pat. No. 5,982,143, issued Nov. 9, 1999, to Stuart, discloses an electronic battery equalization circuit that equalizes the voltages of a plurality of series connected batteries in a battery pack. The current waveform is in the shape of a ramp for providing zero current switching. The transformer has a primary winding circuit and at least one secondary winding circuit. In one embodiment, each secondary winding circuit is connected to a different pair of batteries. The equalizing current is provided to the lowest voltage batteries in one-half of the battery pack during one-half of the charging cycle. The equalizing current is then provided to the lowest voltage batteries in the other half of the battery Pack during the other half of the charging cycle. In another embodiment, each secondary winding circuit is connected to a different single battery. The equalizing current is supplied to a lowest voltage battery in the battery pack during each half of the switching cycle. The electronic battery equalization circuit also includes a feedback control circuit coupled to the primary winding circuit for controlling the current from the equalizing current supply source. In another embodiment, optically coupled switches are connected to a battery voltage monitor to provide equalizing current to the lowest voltage even and odd numbered battery in the battery pack.

U.S. Pat. No. 5,923,148 issued Jul. 13, 1999, to Sideris et al, discloses an on-line battery monitoring system for monitoring a plurality of battery cells that identifies and computes individual cell and battery bank operating parameters. The system comprises a controller for designating a given battery cell to be monitored, a multiplexer responsive to designation by the controller for selecting a given battery cell to be monitored or for selecting a battery pack to be monitored, an analog board for receiving electrical signals from a given battery cell for providing an output representing measurement of a parameter (voltage, temperature, and the like) of the given battery cell, a voltage sensor circuit for sensing voltage appearing across positive and negative terminals of the battery pack, and a control board responsive to address information for selectively initiating a load test, battery bank charging, or common-mode voltage measurement.

U.S. Pat. No. 5,914,606 issued Jun. 22, 1999, to Becker-Irvin, discloses a circuit and method for making differential voltage measurements when one or both measurement points are at voltages that exceed those allowed by a typical differential amplifier, and is particularly useful for monitoring the individual cell voltages of a number of series-connected cells that make up a rechargeable battery in which some cell voltages must be measured in the presence of a high common mode voltage. Each measurement point is connected to an input of a respective voltage divider, with all the divider outputs connected to a multiplexer having two outputs. The two multiplexer outputs are connected to a differential amplifier. When the voltage dividers are "closely matched," the output of the differential amplifier is directly proportional to the differential voltage between the pair of points to which the dividers are connected, and the differential voltage between those two points is accurately determined. The voltage dividers divide down the voltage of each measurement point so that each is low enough to be input to a conventional differential amplifier. By selecting the "ratio" of each voltage divider, the circuit can be used to measure differential voltages in the presence of almost any common mode voltage. The invention requires a single differential amplifier powered by a conventional dual power supply.

U.S. Pat. No. 5,666,040, issued Sep. 9, 1997 to Bourbeau, discloses a safe, low-cost battery monitor and control system. Electronic modules are connected to the terminals of respective batteries that make up a series string. Each module produces a go/no-go signal for each of four battery conditions: over-voltage, under-voltage, over-temperature and float-voltage, which are read by a network controller connected to each module via a single three-wire local area network. Based on the information received, the controller can adjust the charging current to the string, terminate the charge cycle, limit the current drawn from the string when in use, or disconnect the string from the system it is powering. The controller can record a history of the charge and discharge activity of each battery, so that the weakest batteries can be identified and replaced instead of scrapping the entire string. The system controls the charging current delivered to each battery during a charge cycle to insure that each battery is neither overcharged nor undercharged, by connecting a bypass circuit across the battery's terminals to reduce the charging current when an over-voltage condition is detected, or by reducing charge current to the String, A battery's voltage measurement is temperature compensated so that it can be accurately compared to temperature dependent limits. The addressable switch is bidirectional, so that the controller can, for example, force bypass resistors to be connected across selected batteries in order to heat up the batteries in a cold environment.

US Patent Publication 2007/0279003, published on Dec. 6, 2007, to Altemose et al, discloses a system for balancing charge between a plurality of storage battery cells within a storage battery. The battery balancing system sense changes, possibly caused by environmental influences, in the overall resonant frequency of charge balancing circuits contained within the battery balancing system. Using a phase locked loop based controller, the battery balancing system compensates for the change in resonant frequency by driving the battery balancing circuits at a frequency that matches the actual sensed resonant frequency of the battery balancing circuits.

U.S. Pat. No. 7,489,107 teaches a system and method for charging and extending the life of an electrical storage device and provides for developing a cell model structure of the electrical storage device, determining model parameters for charge-discharge data of the structure, by measuring voltage values of the structure based upon the charge-discharge behavior and deriving an instantaneous damage rate from the measured voltage values, and determining charge-discharge behavior of the structure in a voltage-charge plane to develop a charging profile based upon the instantaneous damage rate, so that the charging profile optimizes a charging current with respect to the damage per cycle. The system and method utilizes a hybrid model approach to extend the overall life of the electrical storage device.

US Patent Publication 2011/0198936 teaches a circuit arrangement including a multi-level converter. The multi-level converter includes: voltage supply terminals adapted to provide an AC output voltage; at least two converter units, each converter unit including input terminals adapted to have an electrical charge storage unit connected thereto, output terminals, and a switch arrangement connected between the input and the output terminals, the switch arrangement being adapted to receive a control signal, and being adapted to provide a pulse-width modulated output voltage having a duty cycle at the output terminals dependent on the control signal, the at least two converter units being connected in series with each other between the voltage supply terminals; and a control circuit adapted to generate the control signals for the at least two converter units such that the duty cycle of the output voltages of the at least two converter units is dependent on a desired frequency of the AC output voltage, and is dependent on at least one of a cycle parameter, or a charge state of the charge storage units.

U.S. Pat. No. 8,183,870 teaches a battery system utilizes a plurality of transformers interconnected with the battery cells. The transformers each have at least one transformer core operable for magnetization in at least a first magnetic state with a magnetic flux in a first direction and a second magnetic state with a magnetic flux in a second direction. The transformer cores retain the first magnetic state and the second magnetic state without current flow through said plurality of transformers. Circuitry is utilized for switching a selected transformer core between the first and second magnetic states to sense voltage and/or balance particular cells or particular banks of cells.

In battery-powered applications there has been a recent effort to utilize an inverted H-Bridge structure for the purpose of battery management and charging. For example, U.S. Pat. No. 4,467,407 to Asano et al. teaches a multi-level inverter topology where the multi-level inverter comprised of a group of DC power supplies including 3 or more which are connected in series, including a plurality of terminals for taking desired voltage levels, and a group of switches whereby a contact of a switch connected to a terminal corresponding to the desired voltage level is closed to output voltages at multi-levels to a load. The Asano system also includes a control circuit, and provides a method by which may provide a voltage to a multi-phase load.

U.S. Pat. No. 5,642,275 to Peng, et al. teaches a multi-level-cascaded voltage source inverter with multiple DC sources whereby the inverter is applicable to high voltage applications. This inverter consists of at least one phase, where each phase has a plurality of full bridge inverters with an independent DC source (i.e. a battery), where the inverter develops a near-sinusoidal approximations, and the inverter has been designed specifically for applications in voltage balancing and compensating reactive power.

U.S. Pat. No. 8,330,419 to Kim et al. teaches a dynamically reconfigurable framework for management of large-scale battery systems. This framework functions on a set of rules that govern how battery cells should be used or bypassed to recover from cell failures. Kim discusses a constant-voltage-keeping policy and a dynamic-voltage-allowing policy that supplies power to various applications, which focuses on voltage output requirements, as well as isolating/removing a cell from the battery string.

U.S. Pat. No. 8,508,191 to Kim et al. discusses a system for charge scheduling in batteries for the purpose of extending battery life by dynamically adapting battery activity based on battery health and load demand. This patent proposes a filtering technique whereby load demand is handled, and a "scheduler" which allows batteries to be charged and discharged simultaneously. Kim is focused on the separation of a battery pack into a section, which may be charged, and a section which may be discharged. To accomplish this, Kim proposes a method for determining the SOC of a battery, and provides a filtering method. The proposed invention, although also proposes a method of detecting the SOC of a battery and using that to determine if a given cell can be used, and goes further by stating applications of load control, scaling, and charging-source flexibility (i.e. AC/DC). The proposed method also discusses fault detection and mitigation, which is not included in this work.

US Pat. Publication No. 2011/0198936 to Graovac et al. discloses a circuit arrangement including a multi-level converter for use in application where an AC motors is required to be driven by a DC source, such as a battery pack. It proposes a method of using the multi-level converter topology to construct an AC sine wave similar to U.S. Pat. No. 5,642,275 to Peng, et al., which focuses on the application of the well-known multi-level converter bridge topology to provide AC voltage to a load by commanding localized switches on the energy storage device. US Pat. Publ. No. 2011/0267005 to Gollob et al. teaches an active charge balancing circuit and energy storage arrangement methods based on a combined electrical switch topology and associated control circuitry to control the switches such that a given cell may be bypassed, or the flow current may be reversed in a given collection of cells.

It would be desirable to provide a battery and/or cell monitoring and management system with minimal complexity such as the absence of need for fusing on sense lines, electrical isolation for each cell, limited leakage current drains on the cells, and limits to overcharge rates for the individual battery cells.

SUMMARY OF THE INVENTION

The present invention is directed to a method and apparatus of creating a dynamically reconfigurable energy storage system comprising one or more energy modules comprising a plurality of circuits interconnected to each other, each circuit having at least two input/output terminals, which can function as input or output terminals; an energy storage unit with a positive terminal and a negative terminal, either of which can be interposed between the input/output terminals; a switch module connected to said energy storage unit, and where the switch module provides parallel, series, and/or bypass connectivity for and enables the ability to reverse polarity in said energy storage unit, and enables the ability to simultaneously charge and discharge energy storage units within the system; and a control unit that monitors an operational state of the energy storage unit in the energy modules and controls the switches, to bypass, connect the energy storage unit in parallel, series, and/or change the polarity of said energy storage unit when connected with the plurality of circuits in accordance with the operational state, wherein the control unit determines a number of energy storage units available for use from the energy storage units in the plurality of circuits.

As used herein, the following definitions are intended to apply to the present application:

"Dynamic" implies real-time, continuous, or instantaneous functionality, such as for example, the ability to instantaneously detect a fault and make corrective action to the same and/or control the energy module.

"Reconfigurable" means that an energy storage device, such as a single battery cell, can have the polarity of its positive and negative terminals changed via, for example, software control of electronic switches. For example, a reconfigurable battery cell would have four (4) options: Positive Polarity, Negative Polarity, Open-Circuit, or Bypassed-Circuit. The configuration is dependent upon some software-based control signal which controls the operation of additional electronics onboard the energy storage element or cell.

"System" refers to both the hardware and software.

"Hardware" refers to all switching, sensing, and physical interconnects including mounting devices, connectors, wiring, and physical chips.

"Software" refers to the control algorithms that governs and controls the timing, switching, and decision-making process based-on either feedback from measurements taken by hardware devices or predictive models.

"Energy Storage Device" refers to any energy storage medium including individual battery cells, capacitors, fuel cells, or combinations thereof, and the like.

"Energy module" or simply, a "module" refers to an individual unit that includes a floating energy storage device such as a single battery cell that can be controlled, in accordance with the present invention, via a software control algorithm and localized electronics to provide a Positive Output, Negative Output, Open, or Bypassed, with respect to its two terminals. Each Energy module consists of an Energy Storage Device such as a battery cell, electronic switches such as MOSFETs (metal oxide semiconductor field effect transistors), isolated control signals, an isolated energy transfer method, and isolated measurement signals (voltage).

"Internal Energy Storage Device" refers to the energy storage device that is being managed and utilized within an Energy Module.

"Local Energy Storage Device" refers to the additional energy storage device that is used to store Externally provided energy to drive the Power Switches of the Energy Modules.

"Pack" refers to a collection of energy modules connected in any combination of a series/parallel configuration.

"String" refers to a limited number of series-connected energy modules.

"Controller" refers to a microprocessor device, which contains software control and monitoring processor.

"Stacked" refers to an act of physically connecting one or more modules with respect to each other. This term can refer to a series or parallel connection, and will be indicated as such.

"Pyramid Management Structure" refers to the managing architecture used to manage any Pack.

"Manager" refers to a microprocessor programmed with software relevant to the tasks undertaken by the Manager.

"Group Controller" refers to a Manager that is charge of a grouping of one or more energy modules that have their terminals connected in Series. A Group Controller will then have two or more Energy modules with a single open terminal on each end of the series connection.

"String Controller" refers to a Manager that is in control of one or more Group Controllers, with their open terminals, connected in series. Again, just as with a Group Controller, there will be two energy modules with a single open terminal on each end of the series connection.

"Parallel String Controller" refers to a manager that controls several String Controllers connected in Parallel. Each String Controller can be isolated from the others via a switch placed in series within each String Controller's String.

"State of Charge Algorithm" refers to the modeling algorithm that is used to determine the current energy available within a cell. Such algorithms are known in the art. One such algorithm is disclosed in U.S. Pat. No. 7,489,107, which is incorporated herein by reference.

"State of Health Algorithm" refers to the algorithm that provides a way to determine the damage a given action causes to a cell. Such algorithms are known in the art. One such algorithm is disclosed in U.S. Pat. No. 7,489,107, which incorporated herein by reference.

"Fault Prediction Algorithm" refers to the algorithm that uses the parameters provided from the State of Health Algorithm (e.g. damage rate sensor) to determine when an energy storage device is failing.

"Switching Algorithm" refers to any algorithms related to controlling the Power Switches on each energy module. These algorithms may be based upon the following: input source, desired output, such as voltage, current, frequency, and the like, energy available in a given energy module, or Health of an energy module's Internal Energy Storage Device. as well as other external sensor systems that may be attached to the present invention's energy module control system "Communications Protocol" refers to the protocols used to communicate between each of the various management levels as mentioned in the Pyramid Architecture.

"Processing Units" refers to Microprocessors or FPGA or any other computational device.

"Floating" when referenced with Energy Modules refers to an energy storage device that is not connected to, or becomes disconnected from, or is isolated from other devices via electrical switches, to which connect the energy storage device to another device, are open. But, such energy module(s) may be or may have become isolated. When all the modules are bypassed, then all are floating.

"Cell" may be defined as an electrical storage element (for example a battery cell or a capacitor) or an energy generator (for example a fuel cell or a photovoltaic solar cell).

BRIEF DESCRIPTION OF THE DRAWINGS

The foregoing and other features and advantages of the present invention will become apparent to those skilled in the art to which the present invention relates upon reading the following description with reference to the accompanying drawings, in which:

FIG. 10 is a schematic showing the paralleling of internal energy storage devices from within an energy module via a direct physical connection;

FIG. 11 is a schematic showing the paralleling of internal energy storage devices from within an energy module where each energy storage device is connected with an individual switch that provides the capability of removing that particular storage device;

DETAILED DESCRIPTION OF THE INVENTION

The present invention is the result of the discovery that a power supply management system can be based upon a switch module design having 2n+2 switches, where n is 0 or 1 or more, and is based upon the number of storage units, to manage the charging and loads in isolated energy storage devices such that the energy storage devices become fully configurable energy units which may be arranged to produce a variable output energy source in real time. Similarly, the isolated energy storage devices may be reconfigured to best accommodate and receive energy from an external incoming input energy source be in Direct Current or Alternating Current . . . . It will be appreciated that the present invention could be applied to a variety of power supply management systems such as portable electronics, uninterruptible power supplies, electric vehicle power systems, wind power systems, solar power systems, grid storage systems, and the like.

The present invention includes various methods and applications for monitoring, managing, and controlling storage devices, including an apparatus and method of providing fail-safe operation of the switches used within an energy module circuit, an apparatus and method of providing power to a localized, auxiliary energy source in a controlled energy storage application, an apparatus and method of transferring energy to a series-connected energy storage device, an apparatus and method of reducing the required switches for a dynamic configurable energy storage application over an inverted H-Bridge topology. The energy transfer method and apparatus of the present invention are employed for real-time charge and discharge equalization in a battery pack, for setting a default configuration to an energy storage device without employing a controlling device, for measuring battery voltages with differing ground references, and for controlling parallel energy storage devices. The apparatus and method of present invention also allows for additional passive circuitry that self-adapts to the dynamically re-configurable energy storage device to provide auxiliary power for monitoring, controlling, or other auxiliary devices, ancillary systems, and/or circuitry. The software management structure of the present invention enables a dynamically re-configurable energy storage device, a method of transferring energy to controllers and electronic devices with differing ground references, and an application of a pyramid switching structure for the purpose of battery management and control. The apparatus and method of the present invention provides fault protection in battery packs to enable pack functionality after fault, a communications protocol to enable a dynamically reconfigurable energy storage device, and a method of creating multiple, variable, DC sources from one battery pack. The present invention also provides fast charging from DC and/or AC sources.

Figure 1:
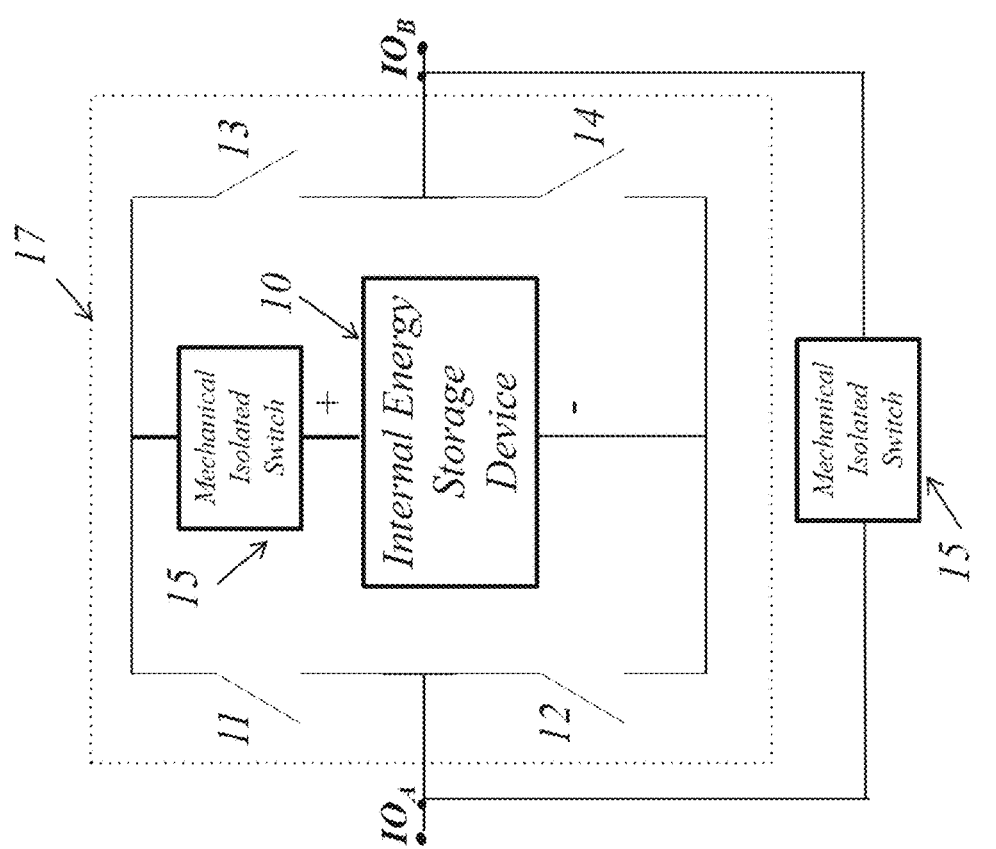
FIG. 1 is a schematic of an inverted H-Bridge energy storage device, additional switches are also shown providing the capability of external cell fault isolation.
Figure 2:
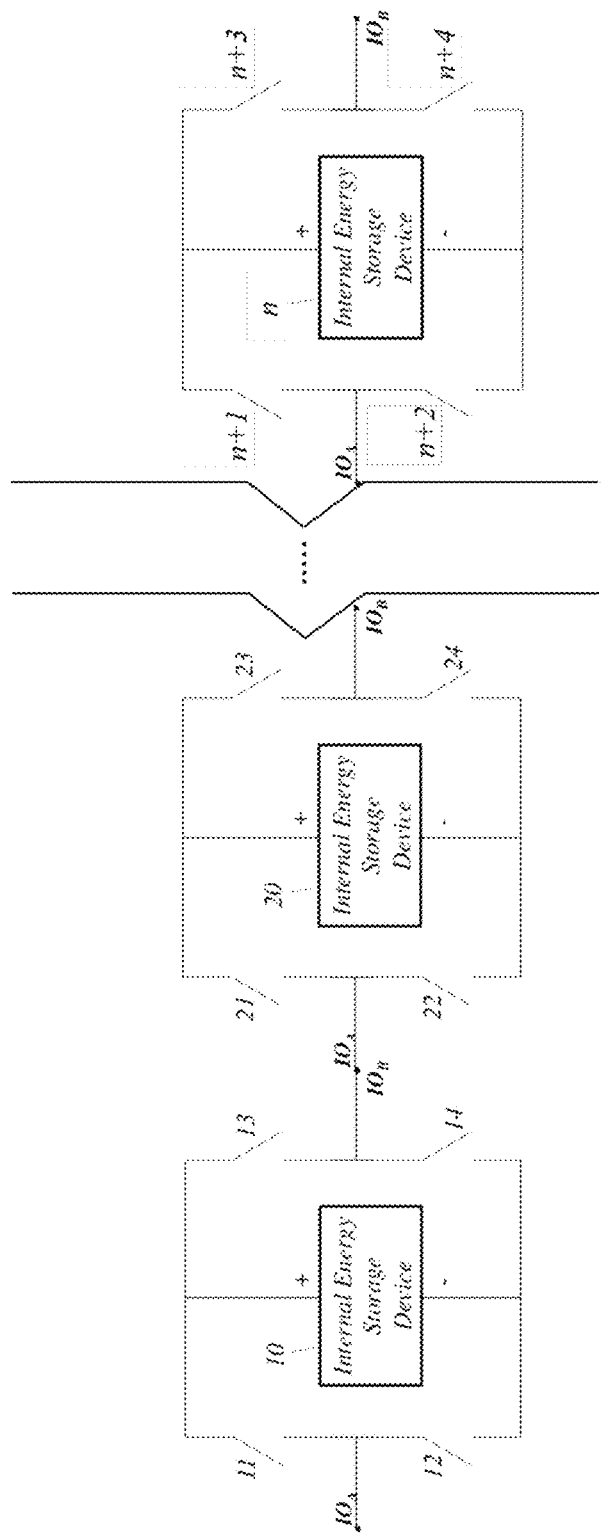
FIG. 2 is a schematic of a generalized grouped connection of the inverted H-Bridge energy storage devices.
Figure 3:
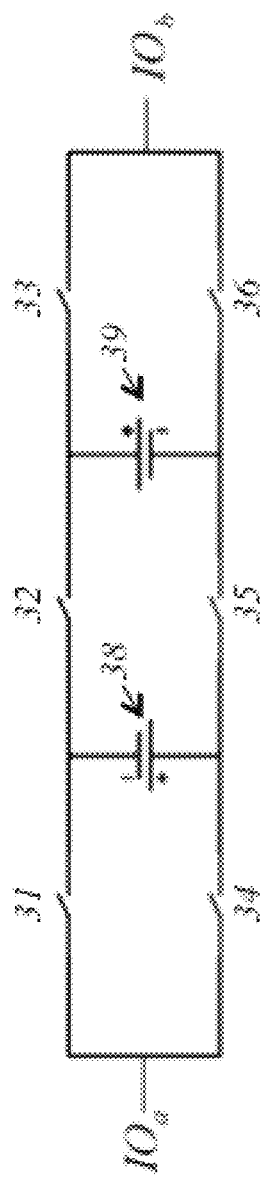
FIG. 3 is a schematic of an Alternative Polarity energy module connected to an energy storage device.
Figure 4:
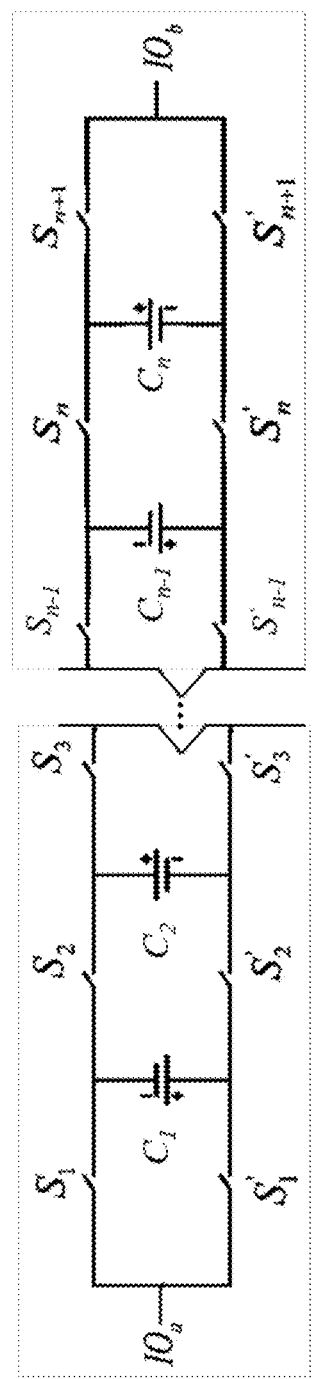
FIG. 4 is a schematic of generalized grouped connection of the Alternative Polarity connected energy storage devices.

The fundamental building block of the present invention is the energy module shown in FIGS. 1 and 3. The energy module may consist of a single energy storage device 10, hardware electronics, and software control signals which are used to control the hardware electronics. Also pictured in FIG. 1 are optional isolation switches 15 and 16 that provide redundant capabilities to allow the controlled energy storage device to be removed from use. Isolation switch 15 opens the electrical connection to the energy storage device from the rest of the energy module. The isolation switch 16 on the other hand shorts the connection points $IO_A$ & $IO_B$. These may be implemented with isolated switches, such as a mechanical relay or micro-electro-mechanical relays. The core components of the energy module are contained within the dotted lines and are designated as 17. Switch components 15, are an optional part of the energy module, and will be discussed further later. The present invention provides the ability for multiple energy modules, such as are shown in FIGS. 2 and 4, to be scaled with the same design in energy module arrays that are either very large (100,000+ modules) or very small (<100 modules) and every size in between. The energy modules are controlled to reconfigure their output as shown in FIGS. 1 and 3.

In FIGS. 1 and 3, the output terminals are denoted as $IO_A$ and $IO_B$. FIG. 1 shows an energy module configuration based upon an inverted H-Bridge and will be designated as Energy Module-Inverted H-Bridge (or EM-IH). FIG. 3 shows an energy module based upon circuitry that allow for alternating polarity and will be designated as Energy Module-Alternating Polarity (of EM-AP). These energy modules 2n+2 switches, where n is 0, 1 or more and is based upon the number of energy modules. In multiple energy module arrays, when it is the EM-IH configuration, the number of switches will be 4n, which starts with 2(n=1))+2. When it is the EM-AP configuration, the number of switches will continue to follow the 2n+2 progression.

The EM-IH as shown in FIGS. 1 & 3, has a minimum of 4 switches, when n is 1, that allow the module to output the following configurations (the 4 switches are designated as 11, 12, 13, and 14 as shown in FIG. 1):
1. Positive Polarized Output voltage with respect to output terminals $IO_A$ and $IO_B$. (12 & 13 opened with 11 & 14 closed).
2. Negative Polarized Output voltage with respect to output terminals $IO_A$ and $IO_B$. (11 & 14 opened with 12 & 13 closed).
3. Bypassed (11 & 13 closed with 12 & 14 opened) OR (12 & 14 closed with 11 & 13 opened)
4. Open (11 & 12 & 13 & 14 all opened).
5. Shorted (11 & 12 closed or 13 & 14 closed). Note this configuration would only be used in a configuration where the cell is either completely open or if there is a fuse in-line with the cell. This condition could then be triggered to induce a large amount of current to blow the fuse and then intentionally remove an energy storage device from the pack.

In order to form a grouping of Energy Modules, this can be accomplished by connecting two or more EM-IH's such that the $IO_B$ of one module is connected to the $IO_A$ of another EM-IH. Variable output voltages may be generated from this grouping of EM-IHs as shown in FIG. 2. The variable output voltages that can be generated directly are as discretized voltage steps consisting of the possible output combinations provided from each internal energy storage device within the Energy Module. In this configuration if the number of internal energy storage devices is 'n', of which none of these internal energy storage device are connected in parallel, there would need to be 4*n switches utilized to implement this Energy Module configuration and various output voltages.

An alternative option of implementing a variation on the grouping of Energy Modules allows the reduction of required switches is disclosed as follows. This configuration will further be designated as the Energy Module-Alternating Polarity (EM-AP). To achieve the reduction of switches, at least two internal energy storage devices are required of which their polarities are alternated as seen in FIG. 3. In this configuration, the same discretized variable voltage outputs can generated as mentioned in the aforementioned EM-IH configuration. The main advantage of using this type of configuration is that the number of switches reduces to 2(n−1)+4 (which simplified is 2n+2), where n is the number of internal energy storage devices within the grouping. The 2(n−1)+4 equation is written in this form to mathematically correlate the number of switches required in the generalized form of the EM-AP configuration as illustrated in FIG. 4. The "2(n−1)" represents the 2 switches connected between all 'n' internal energy storage devices. As for the number "+4 term", this number represents the 4 additional switches, 2 pairs on each end of the entire grouping. Each internal storage device is arranged such that each adjacent internal storage device is arranged to be of opposite polarity, hence the Energy Module-Alternating Polarity designation. The switches shown in FIG. 3 are designated as 31, 32, 33, 34, 35, and 36. Based on the configuration of switch positions, the voltage that may appear at terminals $IO_a$ and $IO_b$ is either:

1) Positive Polarities:
   a. $+2V_{cell}$ (Active switches 34, 32, and 36 are ON)
   b. $+V_{cell}$, This output condition can be induced by two different switching combinations.
      i. 34, 32, and 33 are ON;
      ii. 31, 32, and 36 are ON.
2) Negative Polarities:
   a. $-2V_{cell}$, Active switches 31, 35, and 33 are ON.
   b. $-V_{cell}$: This output condition can be induced by two different switching combinations.
      i. 31, 35, and 36 are ON
      ii. 34, 35, and 33 are ON.
3) Bypassed: ~0 This output can be induced by two different switching combinations
   a. 31, 32, and 33 are ON
   b. 34, 35, and 36, are ON.
4) Open:
   a. 31 and 34 OFF
   b. 32 and 35 OFF
   c. 33 and 36 OFF
5) Shorted: This configuration would only be used in a configuration where the cell is either completely open or if there is a fuse in-line with the cell. This condition could then be triggered to induce a large amount of current to blow the fuse and then intentionally remove an energy storage device from the pack.
   a. 31 and 34 ON
   b. 32 and 35 ON
   c. 33 and 36 ON where $V_{cell}$ is the voltage of the cell.

FIG. 4 shows that by employing n sources we need 2n+2 switches to control the output voltage that has a range of (−2nVdc to +2nVdc) by steps of Vdc (This is under the assumption that each internal energy source voltage is the same value of Vdc. If they have different voltages then the range and steps will simply vary with the different internal energy storage devices voltages). Table 1 illustrates the number of switches and possible voltage levels in the EM-AP novel topology in comparison with the EM-IP converter topology. From Table 1 it can be seen that the EM-AP requires 2n−2 switches less than the EM-IH grouping concept while maintaining the same voltage output capabilities. The lower amount of switches required decreases the number of voltage drops across each switch, which in turn improves efficiency. The decrease in switches also improves reliability by reducing the number of possible switch failures. One main difference between an EM-IH grouping versus an EM-AP grouping is that if one energy storage device needs to be removed from operation from within an EM-AP grouping, an adjacent cell must also be bypassed to allow the grouping to continue its functionality. This is needed to allow the alternating polarity of energy storage devices to be maintained. An even amount of adjacent energy storage devices must be removed. An example of a cell removal follows to help provide clarity to this discussion.

TABLE 1

| | Number of Cells | Number of Switches | Possible Output voltage levels |
| --- | --- | --- | --- |
| Proposed Topology | n | 2n + 2 | 2n + 1 |
| H-Bridge Topology | n | 4n | 2n + 1 |

Figure 5A:
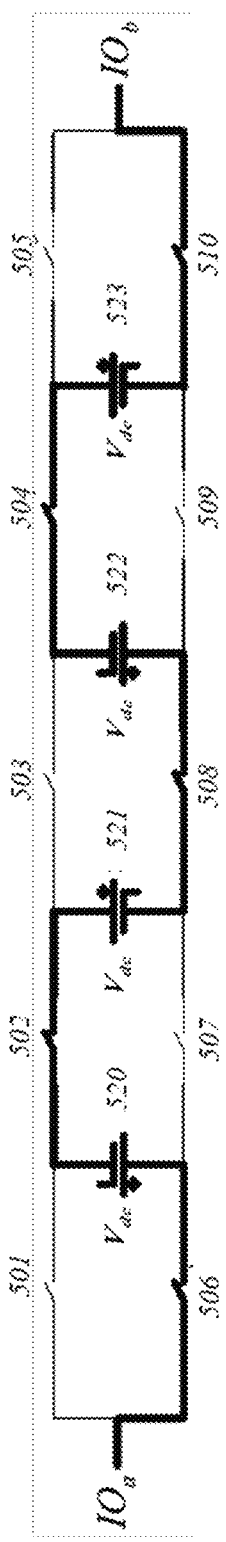
FIGS. 5 A, B, and C area schematic of 4 grouped energy storage devices in an Alternative Polarity configuration configured to output 4×Vdc across its output, and illustrate configurations to bypass an energy storage device.
Figure 5B:
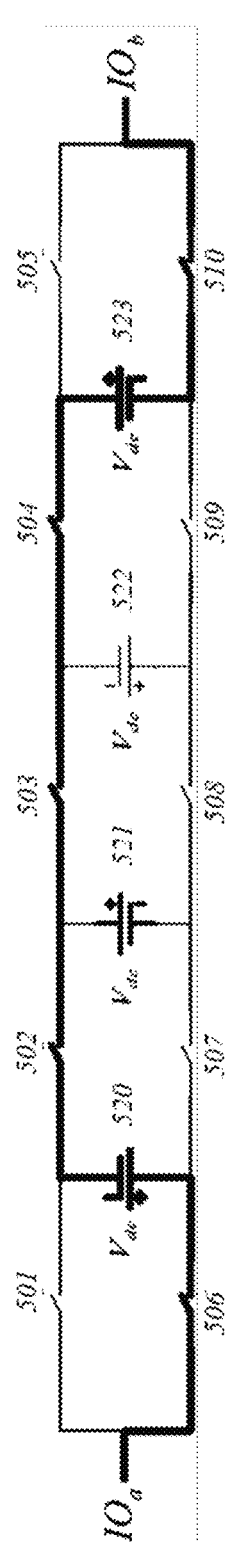
Figure 5C:
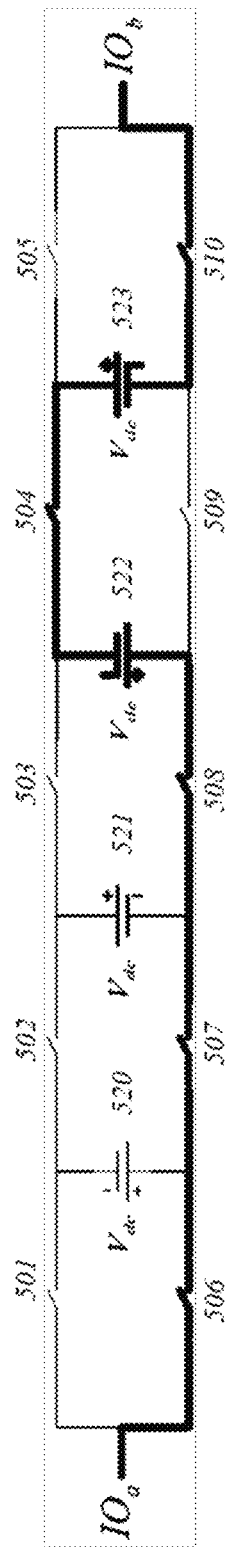

FIG. 5 illustrates the utilization of 4 energy storage devices that are numbered 520, 521, 522, and 523 each with the arbitrary voltage of "Vdc". The highlighted lines and switches are configured such that the output of the grouping provides 4×Vdc as an output voltage. Now assume that energy storage device number 521 needs to be removed from the grouping. There are two options: the first option is changing the switching condition of the right side of the desired energy storage device to be removed as shown in FIG. 5B. Since 503 and 508 are complementary switches, when 503 is closed and 508 is opened, energy storage devices 521 and 522 are removed from the grouping's overall output. This allows the desired energy storage device number 521 to be bypassed over and remain unused while also undesirably removing storage device number 522. Notice if energy storage devices 520 and 522 were just connected in series by bypassing storage device 521, the effective output voltages of 520 and 522 would oppose and therefore negate one another. If the voltages of energy storage devices 520 & 522 canceled each other out, the maximum voltage output from the group would then be the voltage of energy storage device 523. However, by bypassing the two energy storage devices (521 & 523) together, the maximum output voltage from the grouping is now the available output of energy storage devices 520 & 523. The second option is simply changing the switching configuration for the left side of the energy storage device to be removed as shown in FIG. 5C. A similar strategy may be used for other conditions that require cell removals for a given desired output. In contrast to the configuration only one cell needs to be removed at a time and therefore only one voltage output is removed from the maximum output voltage from the EM-IH grouping.

As has been aforementioned, only discretized output voltages may be output from a grouping of Energy Modules (consisting of the combination of the internal energy storage devices' voltage within the grouping). As an example of this concept, if there were a hypothetical energy module grouping consisting of three (3) battery cells with voltages 1V, 1.5V, & 2V, then possible output voltages from the grouping could be positive and negative values of the following values: 0V, 1V, 1.5V, 2V, 2.5V, 3V, 3.5V, and 4.5V. With the additional usage of filtering components (e.g. capacitors, inductors, and/or active filter components, etc. . . . ) and a switching frequency designed for the chosen filtering components, additional voltages may be generated beyond the discretized values. By switching between two discretized steps (e.g. switching a single energy module's state between Polarized Positive and Bypassed) additional output voltages between the discretized steps is possible. For example, switching an energy module between Polarized Positive and Bypassed at a high frequency at 50% duty-cycle (i.e. on for 50% and off for 50%), would allow for an output voltage that is 50% of the internal energy storage device. This is of course is assuming a properly designed low-pass filtering network, of which designs of these circuits are straight forward and well known in the literature. This is known as pulse-width modulation, which essentially controls the percentage of on-time versus off-time in a fixed period of time. In the case of an Energy Module grouping, pulse-width modulation allows for achieving output voltage steps that are a percentage of one or more of the internal energy storage's voltage. Going back to the original example of an Energy Module grouping with battery cells having voltages of 1V, 1.5V, &2V. Using pulse-width modulation on the Energy Module containing the 1V at an 80% duty-cycle and with low-pass filtering on the output on the Energy Module grouping, a voltage output of 0.8V can now be achieved. Using this concept within the present invention, a much larger range of output voltages can now be achieved.

This allows for voltages between the increments of the cells themselves, so it would be required if finer control on the overall voltage is required. For example, if each cell in a grouping was 3V without this concept the options are to run the motor at 3V (1 cell), 6V (2 cells), or 9V (3 cells). For finer output voltage or speed control it might be desired to switch one energy module at 50% duty-cycle such that, that energy module outputs an effective 1.5V. Also, while switching for the duty-cycle there are inherent switching-losses in terms of heat. By performing a round-robin style selection of which energy module actually performs the duty-cycle switching, the heat dissipation can be distributed across several Energy Modules and allow for smaller heat sinks. Further, such fine-tuning of the output voltage will eliminate downstream voltage regulation, improving overall performance, increasing efficiencies and reducing balance of system.

When connecting Energy Modules together to form a large energy storage system, the need for isolated switch-driving circuitry or voltage-level shifting circuitry is required to properly drive each switch within the Energy Module Grouping. The present invention provides a method of providing fail-safe operation to an Energy Module circuit and a method of providing power to a localized, auxiliary energy source in a controlled energy storage application. This enables scalability of the resulting energy storage system while intelligent management and control of the isolated control system provide additional system features and fault tolerance.

The Energy Module's switches can be driven and powered by either an internal energy storage device or an external energy source. As shown in FIG. 1, an Energy Module comprises of an energy storage device, four switches, 11, 12, 13, and 14 and two input/output points, $IO_A$ and $IO_B$. In the case of driving and powering switch from the Energy Module's internal storage device, an issue occurs when the internal storage device drops to a low voltage or low charge state. This would result in there not being enough energy to control the Energy Module's switches. The logic controlling the Energy Modules could stop running the application or skip a particular Energy Module that is in a low charge state to prevent this issue from occurring. However, if the cell fails from a cell defect (e.g. failing open-circuit or short-circuited) the issue of powering the switches remains.

Alternatively, these switches may be driven from an external power source. By driving the switches with an external source, the switches can be controlled without dependency on the state of charge of the Energy module's energy storage device. An "externally-powered" switch implies that the switch driving circuitry is powered from a separate source other than the internal energy storage device. In other words, a separate external energy storage device would be used to power and drive the switch circuitry. This could mean that an external power source transmits energy to the Energy Module to be used or stored specifically for the purpose of driving its switches. Another option is to instead utilize switches that are inherently driven externally. An example of this would be mechanical switches (e.g. mechanical relays or reed switches). Mechanical switches can be externally controlled regardless of the state of the Energy Module's storage device. However, mechanical switches have performance limitations such as speed of switching and relatively high power consumption. Solidstate relays or MEMS relays are also an alternative option that may meet speed demands and lower power consumption.

Without a method to circumvent a failed or low-voltage Energy Module's energy storage device, the Energy Module's power switches cannot be controlled. If the power switches cannot be controlled, the specific energy module will not be able to be commanded to change state. This in turn would affect its ability to charge/discharge, when the power switches are semiconductor devices. The ability to charge/discharge would be affected since semiconductor devices require specific voltage or current biasing at their terminals to behave properly when they are utilized as switches. Without proper biasing, the semiconductor power switches may switch to an unknown state regardless of whether the control signal to the switch commands it to be open or close. Note that although the configuration was shown and discussed here, the previous discussion can also be used with an EM-AP configuration. So, when additional concepts are discussed and related to the configurations, these concepts can easily carry over and apply to the EM-AP configurations, unless otherwise noted.

Figure 6:
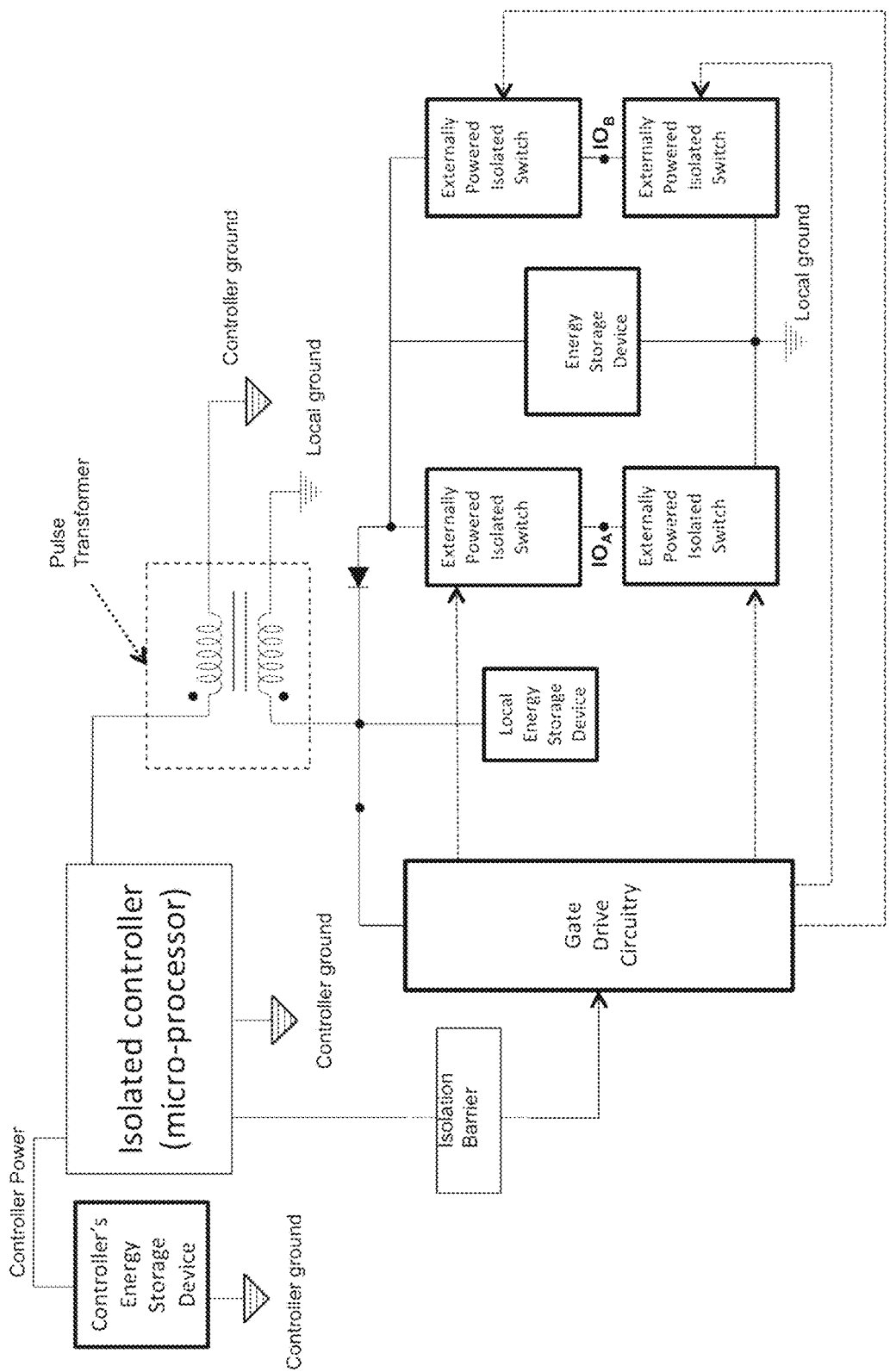
FIG. 6 is a schematic of the isolated control and power of inverted H-Bridge topology via energy from a hybrid internal and externally local energy storage source.

To expand on the concept of transferring energy from an external source to an Energy Module, FIG. 6 shows a circuit that provides this ability. Pictured is a hybrid of using the Energy Module's storage device and an external source. An additional, relatively small local energy storage device can be used to power the gate drive circuitry. FIG. 6 shows a system, which contains the aforementioned set of 4 powered isolated switches and an Energy Storage Device. In addition to these basic components, also shown in the figure is the driving circuitry for the set of 4 switches, and the additional "Local Energy Storage Device" from which the Gate Driving Circuitry derives its power. This Local Energy Storage Device receives its energy either from an external source via the depicted pulse transformer or via the diode connection to the Internal Energy Storage Device demonstrated in FIG. 6. In order to transport energy to the additional Local Energy Storage Device, the process involved consists of pulsing the transformer to transmit "packets" of energy from the Controller's own Energy Storage. The energy transfer rate is controlled via the Controller (or any other computational device). Alternatively, if the Energy Module's Internal Energy Storage Device has a high enough voltage potential, it will transfer energy to the Local Energy Storage Device via the diode connection shown in FIG. 6. Using a combination of the energy available in the Local Energy Storage Device and electrically isolated control signals provided from the microcontroller, the Energy Module's power switches are controllable. In other words, the isolated signals are used to control the Energy Module's power switch driving circuitry that is in turn powered via the Local Energy Storage Device.

These additional Local Energy Storage Devices can be driven via other externally isolated energy transfer methods as well by using known methods, including those disclosed in U.S. Pat. No. 8,269,455, the disclosure of which is incorporated by reference and which involves the transfer of energy from one energy storage device to another energy storage device and teaches the ability to transfer a relatively small amount of energy to the local energy storage. In the present invention, the energy supplies are, in turn, used to power the switch drive circuitry to control the Energy Module's output configuration. The basic H-Bridge structure is known, and is shown in U.S. Pat. Nos. 4,467,407 and 5,642,275, as well as US Patent Publications 2011/0025258; 2011/0198936, and 2011/0267005, each of which is hereby incorporated by reference. The use of an H-Bridge circuit in the present invention is different since the present invention achieves fault tolerance and fail-safe operation in its system, as well as presenting a method of bypassing a single battery cell for fault-avoidance and addressing isolation of the cell or external-power of the switches. In the known, prior art systems, they must be externally powered, or else they could not function. Further, the present invention takes measurements of current at the cell level, and uses a real-time modeling method to determine the state of charge (or SOC). The present invention has the ability to take advantage of real-time modeling of battery cell dynamics, which is known and is disclosed, for example, in U.S. Pat. No. 7,489,107, the teaching of which is incorporated by reference and which teaches a method of SOC detection, and therefore, management of the system.

Figure 7:
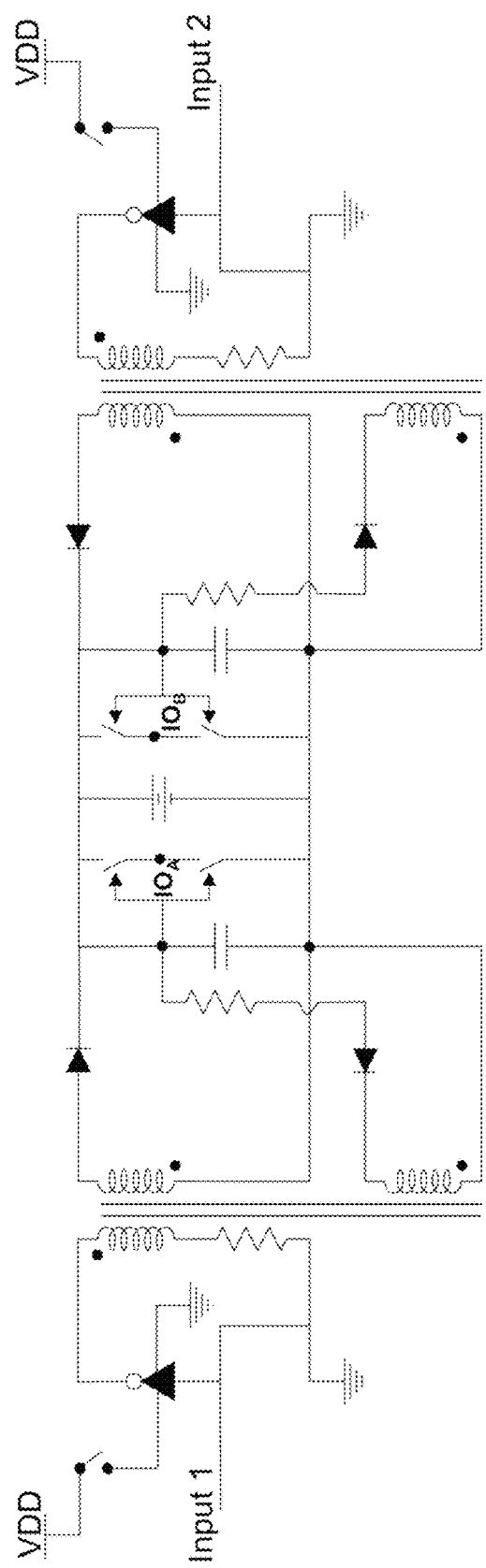
FIG. 7 is a schematic of an isolation method for delivery of power to bridge circuit.

Another alternative method for an "Externally-Powered" Isolated switch is shown in FIG. 7 without the need of an additional "Local Energy Storage Device". A transformer is employed with one primary winding and two secondary windings. Again, FIG. 7 contains the aforementioned set of four (4) Power Switches and the Internal Energy Storage Device. The primary winding of the transformer is pulsed with either positive polarity or negative polarity. The polarity of the pulses to the primary side determines whether the top or the bottom Power Switches of each half-bridge is switched on. In essence, this configuration allows an alternative method of controlling these four power switches through isolated control signals (via pulse transformers). In this alternative method, the switches are driven directly via an external source. Depending on the desired energy module output, Inputs 1 and 2 are configured to either a high or low. As depicted in the figure, each of the inputs, Inputs 1 and 2, are simply input into a separate NOT gate. These NOT gates in turn are powered via a voltage source, namely, VDD. VDD is isolated and has the same ground reference as the external controller that provides signals for Inputs 1 and 2 (e.g. such as a microcontroller or FPGA device). In addition, there are switches connected to the power terminal of the NOT gates that allows VDD to be switched on and off to the NOT Gate. When VDD is switched on to the NOT gates the coils have a potential across them and a current is induced depending on the values of Inputs 1 and 2. When VDD is switched off to the NOT gate, the NOT gates output goes to a high impedance state and therefore is no longer driven. In this state, there is no current induced. If the desired Energy Module states are only: Bypassed, Negative Polarized Output, or Positive Polarized Output (as detailed above), then a minimum of two independent signals are required to drive these switches. This is the configuration that is pictured in FIG. 7. To actively drive the Power Switches, the switches to VDD must be pulsed on and off to induce current in the transformers and transfer energy across the isolation barrier to drive the Power Switches. As long as VDD is pulsed to both NOT gates, then the Energy Module state can be altered. The state is then dependent simply on the values of Inputs 1 & 2. If Input 1 is High and Input 2 is Low, then the Positive Polarized Output state is active. Similarly, if Input 1 is Low and Input 2 is High, then the Negative Polarized Output state is active. Lastly, if Input 1 and Input 2 is either both Low or both High, the Bypassed state is active.

Some type of computational device or controller has been alluded to in the aforementioned descriptions of an Energy Module and its usage. This controller monitors and manages a Grouping of series-connected Energy Modules. The monitoring consists of looking over an Energy Module's health and energy stored and the control consists of changing an Energy Module's output configurations. The Grouping of multiple Energy Modules is explained further, below. In order to power this controller device and/or other auxiliary devices it would be advantageous not to have to provide an additional energy source, such as an additional battery cell. The additional source would need to be managed, charged, and monitored. Alternatively, it would be possible to use one or more of the internal energy storage devices inside one of Energy Modules to directly provide the needed power. However, in that case more power would be drawn directly from that particular Energy Module's internal energy storage device than the others; even when the application the Energy Module grouping is running is not in use. This would be non-ideal in situations where the grouping of Energy Modules are not charged for long periods of time. This could result in that Energy Module's internal energy storage device being over-discharged to the point the storage device is damaged and also where the power is insufficient to keep the controller device powered. It would be possible to size the Energy Storage Device used to power the controller much larger than other Energy Module's storage devices, however, this would just lead to the same issue if the Grouping goes uncharged for a period of time. In order to remove the need for an additional energy source in this configuration or directly utilizing one of the Energy Modules internal storage devices directly, it would be advantageous to be able to obtain energy from the Grouping of multiple Energy Modules themselves. An active method and a passive method to provide energy from the Grouping of Energy Modules will be disclosed.

Figure 8:
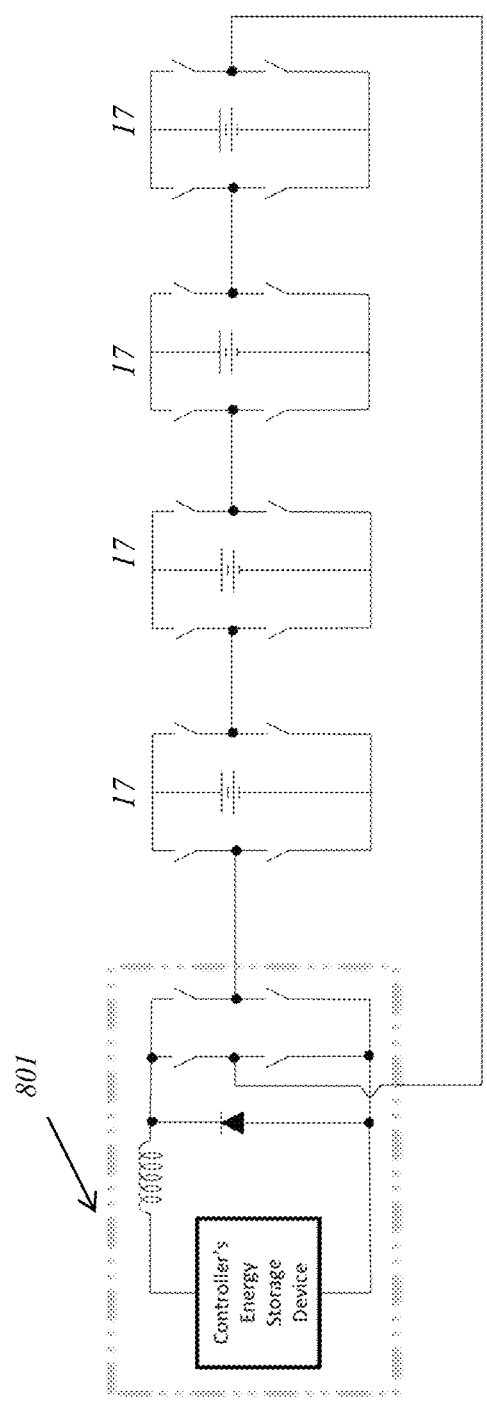
FIG. 8 is a schematic showing a series connected inverted H-Bridge modules with active energy transfer circuitry using an energy storage device used to power auxiliary circuitry.

The following is an active method to transfer energy from one or more Energy Modules within a group to another separate energy storage device, additional circuitry is required. By adding four additional switches, an inductor, and a diode across the output of a Group of Energy Modules, energy may be transferred from one or more cells to another energy storage device as shown in the dotted line box of FIG. 8 and designated at 801. This energy can be used to provide Auxiliary Power that is utilized to power controlling and monitoring circuitry, or any other circuitry that is not directly being driven by the overall Energy Module Grouping's output. As an example, if the Grouping of Energy Modules is used to directly drive a motor within a golf cart, the auxiliary power in this case would be used to power the controlling device, a +12V radio, headlamps, and other accessories. Provided at least one Energy Module is connected to output a positive or negative output across the Energy Module's terminals within a series-connected Energy Module String, this output potential may be used to deliver energy to the separate energy storage device. The circuitry within the dotted-line box essentially is an H-Bridge circuit and Buck Converter. The H-Bridge portion allows the incoming energy, from the Grouping of Energy Modules, to be switched to the desired polarity to charge the separate energy storage device. The inductor and diode form the Buck Converter that regulates the current and charging of the separate energy storage device. Again, the energy within the separated energy storage device is specifically used to power Controllers or any circuitry used to provide monitoring and control over the Energy Modules they are managing. Since the Controller will be in control of managing the output configurations of the Energy Modules it's managing, it will know which way to switch the H-Bridge circuitry to charge the separate energy storage device that it is being powered from. This idea is valuable due to the nature of the Energy Module topology, in that there are no consistent ground references within the Pack. So in a very large Energy Module Pack that may have several controllers, it would be advantageous to not have additional external sources to power Controlling devices within an Energy Module Pack and still allow ease of scalability (without having to provide additional methods of powering and managing each additional Controlling device).

Figure 9:
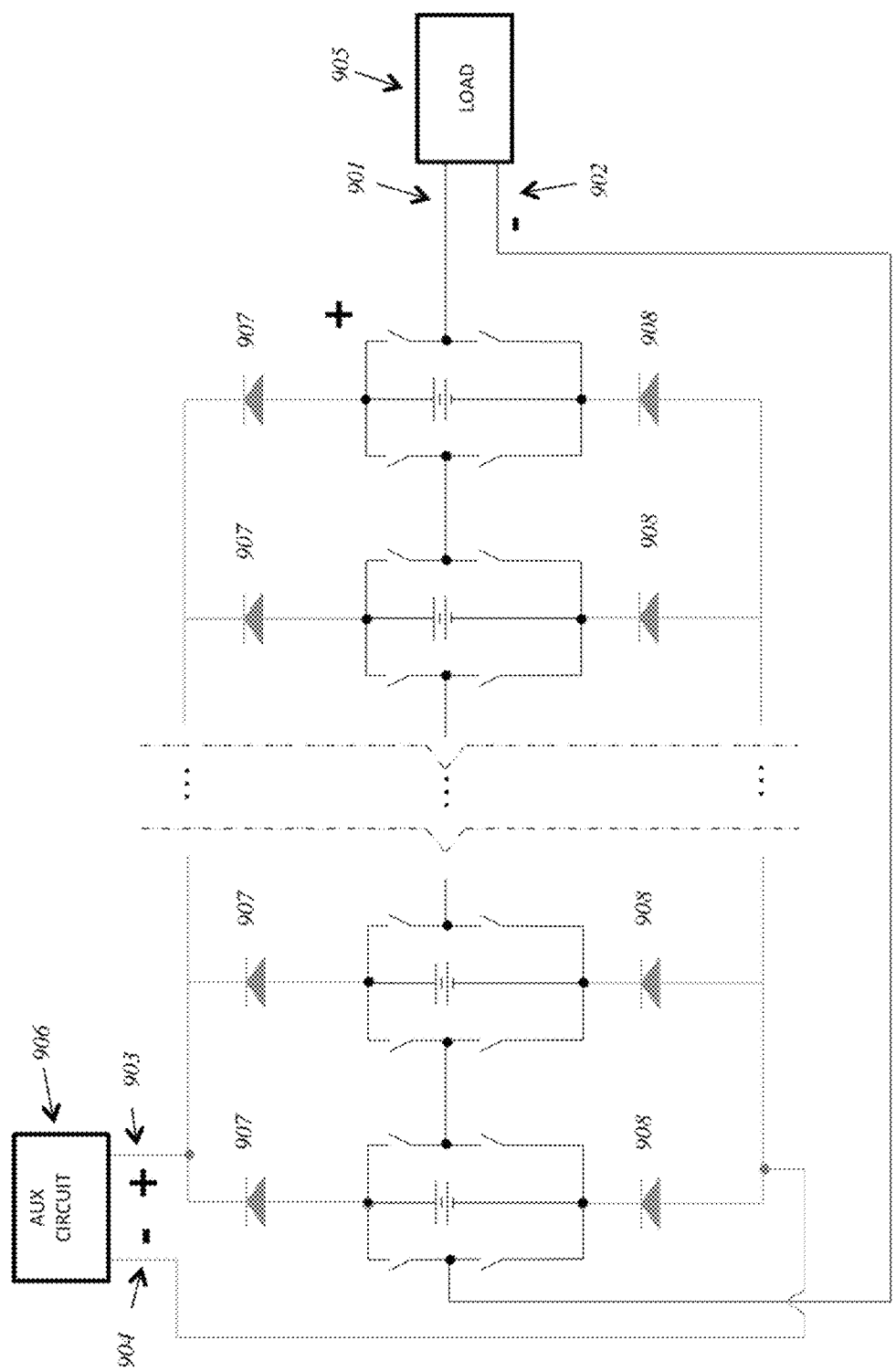
FIG. 9 is a schematic showing a series connected inverted H-Bridge modules with passive circuitry that enables the powering of auxiliary circuitry.

The following is a passive method to transfer energy from one or more Energy Modules in a grouped configuration to again provide aforementioned Auxiliary Power. The passive circuitry consists of the addition of two diodes per an Energy Module. This is pictured in FIG. 9 with a generalized number of Energy Modules connected in a grouping. The anode of the first diode is connected to the internal energy storage device's positive terminal and the cathode of the second diode is connected to the cell's negative terminal. As shown in FIG. 9, all the diodes connected to the positive terminals of their respective energy storage device, have their cathodes tied together. Similarly, all of the diodes off of the negative terminals of their respective energy storage device have their anodes tied together. The common tie points 903 and 904 are the positive polarity and negative polarity connection points for the auxiliary power circuitry, respectively. These two common tie points connect to the Auxiliary Circuitry represented by 906. Examples of what the Auxiliary Circuit can comprise of is: regulating circuitry (i.e. linear regulator or dc/dc converters), of which could be used to power the controlling and monitoring devices as well as any other auxiliary devices as mentioned in the aforementioned discussion on Auxiliary Power.

In terms of what voltage appears across 903 and 904, there are three cases to consider. These three cases correlate with the configuration of the Energy Modules in the grouping and their collective resulting output to the output terminals 901 and 902. A generic load is shown and represented by 905 (e.g. motors, LED lamps, AC device, etc. . . . ). For reference and discussion, 901 and 902 are designated as positive and negative, respectively. The first case to consider is when the energy modules are configured to output some given magnitude with a positive polarity output out across 901 and 902. The second case is when the energy modules are configured to output some given magnitude with a negative polarity across 901 and 902. The third case is when no output voltage is across 901 and 902 (when all energy modules are configured to the Bypass State or the Open State).

In the first case of a Positive Polarity Output to Terminals 901 and 902, the polarity of the voltage that appears across Auxiliary Circuit Input Terminals 903 and 904 is also positive. The voltage of the magnitude that appears across Auxiliary Circuit Input Terminals 903 and 904 is dependent upon the output that goes to the Load Output Terminals 901 and 902. Depending on the configuration of the individual Energy Modules the magnitude to the Input Terminals of the Auxiliary Circuit range from [+(Vcell), +(n×Vcell)], where 'Vcell' represents a nominal voltage from each Energy Storage device and 'n' is the total number of Energy Modules. The Auxiliary Circuit would then be designed to take this positive polarity varying magnitude and convert it to a desired voltage it needs to power its own components via a dc/dc converter.

In the second case of a Negative Polarity Output to Load Terminals 901 and 902, the polarity of the voltage that appears across Auxiliary Circuit Input Terminals 903 and 904 also happens to remains positive. As a result of this feature, the second case behaves similar to the first case and again depending on the configuration of the individual Energy Modules the magnitude to the Input Terminals of the Auxiliary Circuit range from [+(Vcell), +(n×Vcell)]. Again this positive varying magnitude can be converted via a dc/dc converter as needed by the Auxiliary Circuit components.

In the third case, when all energy modules are in the Open state or Bypass state, the energy storage devices are effectively connected in parallel to one another. This is under the assumption that all energy storage device voltages are equal. However, if one energy storage device happens to have a higher voltage than the others, the individual highest voltage of all the energy storage devices will appear across the Auxiliary Input Terminals 903 and 904. This provides a very beneficial feature that allows the energy storage devices to self-balance by utilizing the highest voltage energy storage device to provide energy the Auxiliary Power circuitry. The highest voltage energy storage device would continue to be utilized until its own voltage decreases (due to the decreasing amount of energy stored). It will continue to decrease to the point it becomes equal to the second highest charged energy storage device. At this point, both devices will then decrease in voltage together until they become equal the next highest voltage energy storage device. This would continue until all energy storage devices' voltages come down to lowest voltage energy storage device. At that point all energy storage devices would be connected in parallel.

In summary of the passive concept, two main benefits are: 1) that it automatically becomes a passive energy storage device charge equalizer when all energy modules are in the Bypass-state or Open-state because it forces the use of the highest voltage energy storage device (which correlates with the highest charged device). 2) It creates an automatic fixed-polarity, magnitude-varying voltage output that can be used for powering other devices.

With the present invention, if a control signal is removed or lost, "configuration switches" (i.e. dipswitches, programmable latches, jumpers, etc.) may be employed to allow an energy module to default to one of the four aforementioned configurations (Open, Bypassed, Positive Polarized Output, or Negative Polarized Output). These "configuration switches" allow the power switches to default to a desired output configuration. This allows energy modules to be used in this default configuration without the need of a software controller (and the associated additional power consumption of the control signals). These "configuration switches" simply would control whether each half-bridge is pulled-up or pulled-down (assuming that the half-bridges are implemented with semi-conductor switches). Thus, the present invention provides a method of setting a default configuration to an energy storage device without employing a controlling device, while the energy module is not actively being controlled. Similarly, one could apply external "override" or "shut-off" control if so desired.

Energy storage devices have a maximum current limitation—if higher current is required, this can be addressed by adding additional internal energy storage devices in parallel into the energy modules. FIGS. 10 and 11 illustrate how the present invention provides a control method for paralleling energy storage devices. Each of these figures represents Energy Modules with Internal Energy Storage Devices paralleled with either direct connections or switched connections, respectively. FIG. 10 demonstrates a configuration where the Energy Module's Internal Energy Storage Device consists of several direct electrically connected paralleled energy storage devices. FIG. 11 on the other hand demonstrates a configuration where the Internal Energy Storage Devices are still connected in parallel. However, only one side of each energy storage device is directly electrically connected. The opposite side of each energy storage device is connected via a controllable switch 1101. The directly connected method of FIG. 10 enables higher current by physically connecting energy storage devices directly in parallel. Since the energy storage devices are connected in parallel, the Energy Module switches could behave exactly the same as if it had only one internal energy storage device. The switched connection of FIG. 11 method enables higher current by paralleling energy storage devices; however, each paralleled storage device can be switched in and out of the parallel connection. This method provides the capability for isolation and removal of a detected failing Energy Storage Device within a grouping of parallel connected Energy Storage Devices.

To allow both scalability and flexibility of connecting energy modules in various parallel or series configurations, the present invention employs a management architecture that can also adapt to these configurations and, thus, enables a dynamically re-configurable energy storage device. This management architecture is key to the present invention. By this management structure, the system inputs & outputs are controlled, producing the results discussed previously, including real-time configuration of an energy module's state (Open, Bypassed, Positive Output, Negative Output), AC/DC input or output configuration of a pack and general energy management capability.

Figure 12:
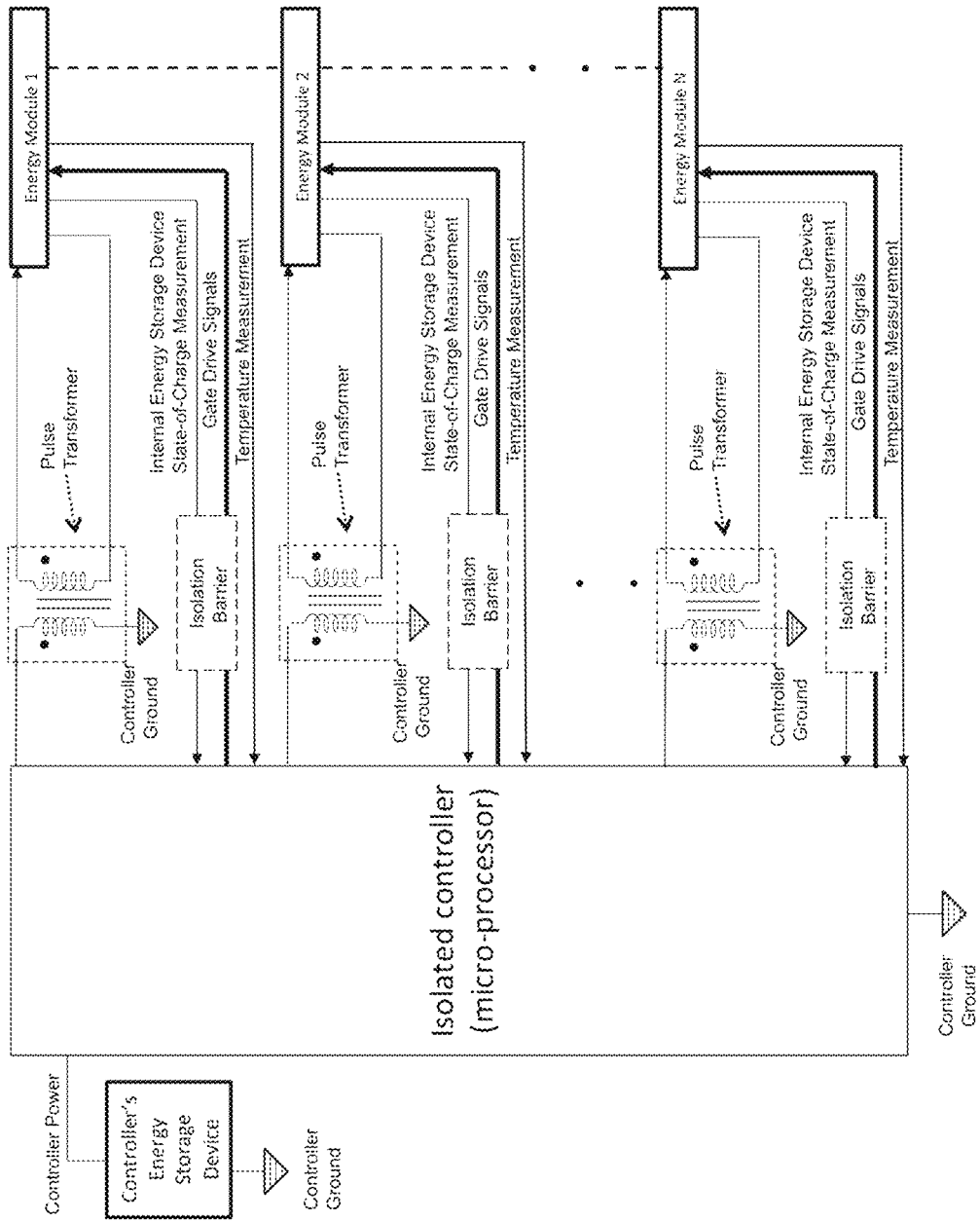
FIG. 12 is a schematic showing a series-connected inverted H-bridge module grouping with active energy transfer circuitry that uses an energy storage device to power auxiliary circuitry.
Figure 13:
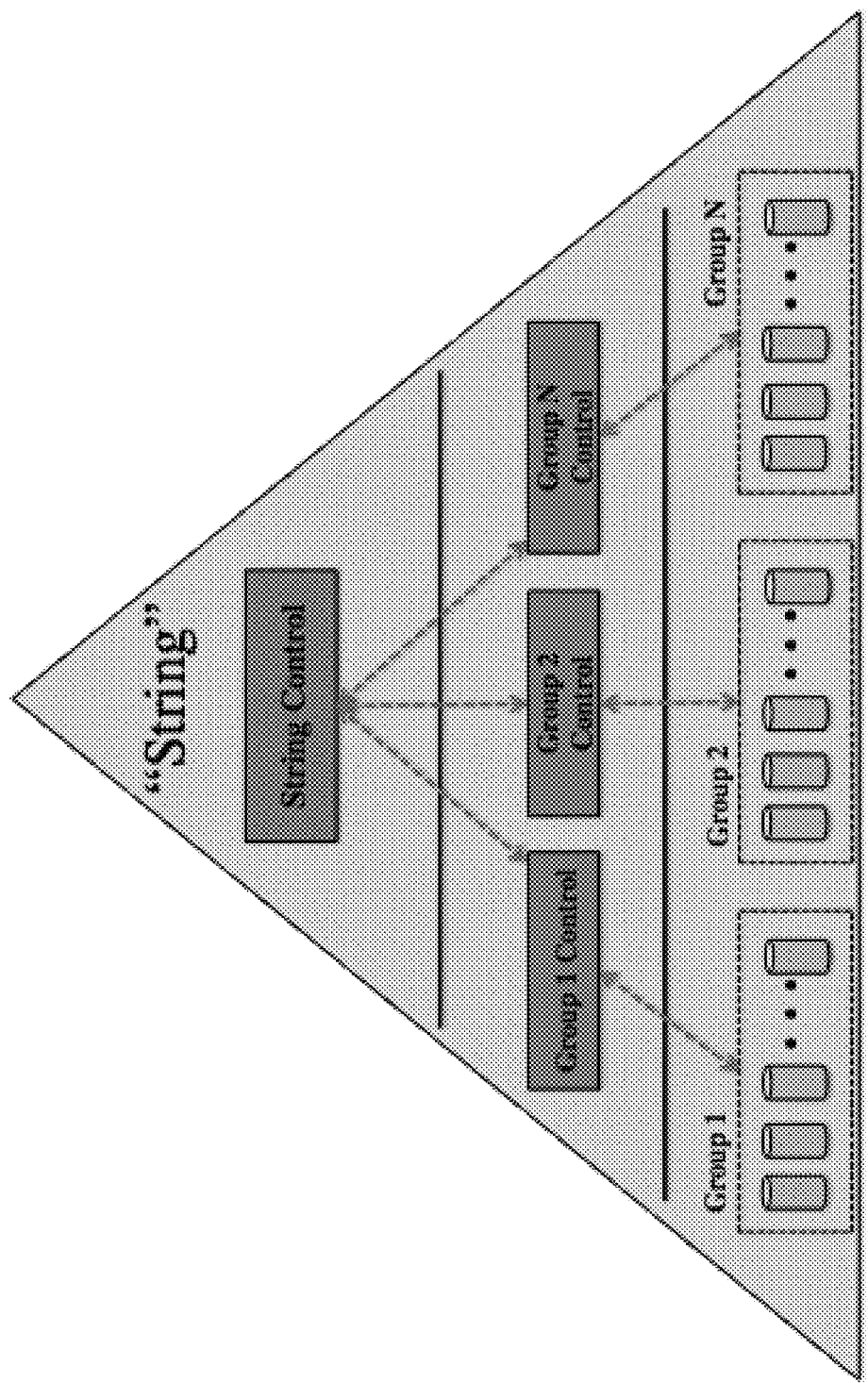
FIG. 13 is a String Controller controlling multiple Group Controllers.

The present invention facilitates the scale up of the modules, and FIG. 2 illustrates a grouping of energy modules. A Group Controller manages a set of Energy Modules that form a single group. The Group Controller would simply be an extension of the microcontroller that's demonstrated in FIG. 12 but instead with Power Switch Control signals (also referred to as an Energy Module's gate drive signals) for each Energy Module within the Group, as well as voltage measurements. Voltage measurement presents a challenge since each Energy Modules' internal energy storage device is floating. Each energy module can have a different reference point based upon its current switch configuration and thus, differing ground references. To enable the capability of making this measurement at any time, the voltage of each Energy Module is monitored through an isolated method such as a voltage-to-frequency converter fed into an opto-isolator or a locally powered microprocessor that uses an onboard analog-to-digital converter and sends a digital signal via an opto-isolator. An alternative approach that is non-isolated that can also be used is a high voltage common mode differential amplifier. These devices allow for high differential voltages to be measured much further beyond the power rails of the differential amplifier device. The Group Controller will also measure temperature and current in and out of a String. It should be noted that the temperature sensors do not necessarily need electrical isolation, and can be powered by a local power supply (e.g. that is at the same reference ground of the Group Controller). The current is measured once for an entire series string of Energy Modules. Each of the Energy Modules are connected physically, as demonstrated in FIG. 2, and depending on the number of energy modules chosen in a group, the highest voltage obtained from the group is the nominal voltage of the internal individual energy storage devices voltages summed. As shown in FIG. 13, a String Controller manages two or more sets of grouped Energy Modules, which in turn forms a single string. Therefore, connecting one Group Controller's energy module to the next group controller's energy modules forms a string. The highest obtainable voltage from the string is then the nominal voltages of all the internal individual cells from each group controller's group summed. As shown in FIG.

14, a parallel string controller manages several strings allowing multiples of these strings to be connected in a parallel configuration. A single string is limited to a physical limitation (defined by energy storage device manufacturer) in terms of the amount of current that can be drawn from a given energy storage device. If more current is required, additional parallel strings may be added at which point a given parallel string controller will manage how many strings will be used to suffice a required current demand.

Figure 14:
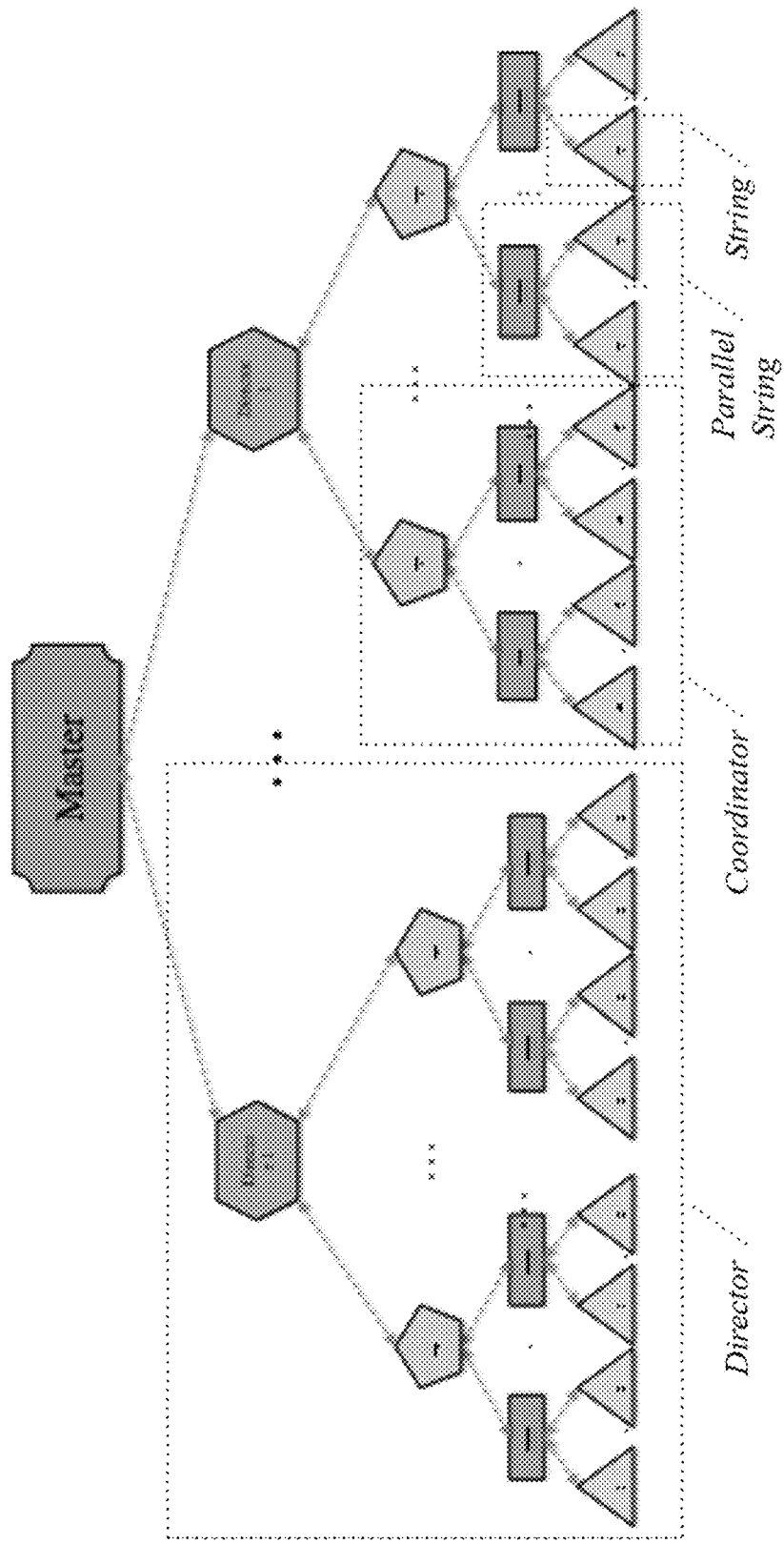
FIG. 14 is a diagram of a Control Architecture Hierarchy that contains a Master Controller, with Director, Coordinator, Parallel String Controllers, String Controllers.

A coordinator's purpose, also shown in FIG. 14, is to manage multiples of the Parallel String controllers. When a request for current draw is required, the coordinator will check with the parallel string controllers it is currently managing and request acknowledgement on how many strings from each parallel string controller will be used. If there are too many parallel string controllers for a single coordinator to handle, multiple coordinators are needed. The hierarchy could continue through a director, which is also shown in FIG. 14. At the very top sits a single master controller, shown in FIG. 14 that watches over at most 'X' number of management positions below them. Every application has a single master controller. The master controller will monitor the input energy source as well as control the overall energy output from the entire pack of energy modules.

The Master Controller and other hierarchical controllers can also accommodate fiber optic and other pressure sensors, off-gassing sensors and other external sensors that may or may not require electrical isolation. Further, the present innovation's real-time controllers can interact with other external control systems and/or other applications.

In a small application with only a single grouping of Energy Modules, the Master Controller can potentially be just a Group Controller. Alternatively, depending on the size of the overall Pack, the Master Controller can also be just a single String Controller, or a single Parallel String Controller, and so on. Further, the Master Controller can be any of the lower management levels previously described provided that it is only overseeing 'X' number of direct reports. If there is more than 'X' number of "direct reports", then that number of "direct reports" can be sub-divided amongst a level of Directors. If necessary the number of Director Levels may be added until the number of "direct reports" can be tied to a single Master Controller. This is done to limit communication traffic that is seen directly by the Master Controller.

To further illustrate how the cells (C) can be grouped with a number ('A') of cells (or more generically any energy storage device, anywhere in the document in which the term "cell" is used it can be interchanged with any type of energy storage device). The maximum for the number 'A' is based upon a practical limit imposed by how many cells can be monitored by a single processing device. In addition, these cells are not required to be the same type in terms of chemistry, size, or even the same type of energy storage device. Also for the rest of this document, anywhere where a single cell is mentioned, it could instead be replaced with parallel cells as shown in FIG. 10 or FIG. 11.

The notation for a grouping is given as $\{C[1], C[2], \ldots, C[A]\}$. Each group does not necessarily need to contain 'A' number of cells and can contain less than 'A' (this value has the flexibility to be adapted with the given application). However, for the sake of symmetry, we will continue the discussion with 'A' number of cells in each group.

Group Controller: 'GC'

A single Group Controller manages each of these groupings of 'A' cells. This grouping of 'A' Cells is connected physically as a String of inverted H-Bridge Modules as shown in FIG. 2. A Group Controller will monitor and manage each individual cell's characteristics (by measuring voltage, temperature, current, and implement real-time modeling to determine state-of-charge, state-of-health, state-of-life, fault detections, etc.).

Example

If there is a Group Controller with 'A' number of cells in its group, we can denote it as:

$$GC\{C[1]C[2] \ldots C[A]\}$$

Matrix 1: A Single GROUP CONTROLLER WITH a Grouping of 'A' Cells.

A String Controller manages several Group Controllers. A String Controller is in charge of at most 'B' number of these Group Controllers. Again, the number 'B' comes from a practical limitation of the hardware used to implement the system. So each String Controller will manage up to 'B' groupings (but again, less than 'B' groupings can be managed by a single String Controller). Since this is a "String Controller", each Group Controller being managed under that given String Controller is connected to one another. In other words, the cells from one Group Controller is in the same series String of inverted H-Bridge Modules of another Group Controllers' cells, provided they are being managed by the same String Controller.

This allows a Series String of cells to grow to a maximum of A×B number of cells in a String (Max number of Cells managed by a Group Controller×Total Number of Group Controllers).

Matrix 2: Two String Controllers each managing 'B' Group Controllers, which in turn have 'A' cells being managed by each Group Controller.

$$SC[1] \begin{bmatrix} GC[1]\{C[1] & C[2] & \ldots & C[A]\} \\ GC[2]\{C[1] & C[2] & \ldots & C[A]\} \\ & \vdots & & \\ GC[B]\{C[1] & C[2] & \ldots & C[A]\} \end{bmatrix}$$

$$SC[2] \begin{bmatrix} GC[1]\{C[1] & C[2] & \ldots & C[A]\} \\ GC[2]\{C[1] & C[2] & \ldots & C[A]\} \\ & \vdots & & \\ GC[B]\{C[1] & C[2] & \ldots & C[A]\} \end{bmatrix}$$

Sub-String Controller: 'SSC'

In the event that a given application requires more Group Controllers than a single String Controller can manage on its own (larger than 'A'×'B' number of cells), a Sub-String Controller is introduced. A Sub-String Controller behaves the same a String Controller except it will watch at most 'C' number of Group Controllers (where 'B' can equal 'C' but not necessarily). The number of Sub-String Controllers will be dictated by the total number of cells that would be required in a String for a given application. Again, the maximum number 'C' comes from a practical limitation of the hardware used to implement the system (but again, less than 'C' groupings can be managed by a single Sub-String Controller).

The Sub-String Controller will directly manage all Group Controllers underneath its scope. The Sub-String Controllers in turn will then report to the String Controller. This allows the devices managed by the overall String Controller to be limited to only 'B' devices.

Matrix 3: A single String Controller that is monitoring over 'B' Sub-String Controllers.

$$SC[1] \begin{bmatrix} SSC\_1[1] \begin{bmatrix} GC[1]\{C[1] \ C[2] \ \ldots \ C[A]\} \\ GC[2]\{C[1] \ C[2] \ \ldots \ C[A]\} \\ \vdots \\ GC[C]\{C[1] \ C[2] \ \ldots \ C[A]\} \end{bmatrix} \\ \vdots \\ SSC\_1[B] \begin{bmatrix} GC[1]\{C[1] \ C[2] \ \ldots \ C[A]\} \\ GC[2]\{C[1] \ C[2] \ \ldots \ C[A]\} \\ \vdots \\ GC[C]\{C[1] \ C[2] \ \ldots \ C[A]\} \end{bmatrix} \end{bmatrix}$$

Sub-String Controller Level

If necessary additional Sub-String Control levels may be introduced to ensure that a String Controller manages at most 'B' devices and also ensures that any Sub-String Controller Level_(X) is managing at most 'BX' number of cells.
  Sub-String Controller Level 1: 'SSC_1'
  Sub-String Controller Level 2: 'SSC_2'
  Sub-String Controller Level X−1: 'SSC_(X−1)'
  Sub-String Controller Level X: 'SSC_X'

Matrix 4: A single String Controller that is managing '$B1$' Sub-String Level-1 Controllers that are in turn managing '$B2$' Sub-String Level-2 Controllers, which in turn are managing their own set of Group Controllers.

$$SC \begin{bmatrix} SSC\_1[1] \begin{bmatrix} SSC\_2[1]\{\ldots\} \\ \vdots \\ SSC\_2[B2]\{\ldots\} \end{bmatrix} \\ SSC\_1[2] \begin{bmatrix} SSC\_2[1]\{\ldots\} \\ \vdots \\ SSC\_2[B2]\{\ldots\} \end{bmatrix} \\ \vdots \\ SSC\_1[B1] \begin{bmatrix} SSC\_2[1]\{\ldots\} \\ \vdots \\ SSC\_2[B2]\{\ldots\} \end{bmatrix} \end{bmatrix}$$

Parallel String Controller: 'PSC'

A Parallel String Controller then manages up to 'D' individual String Controllers. Again, the number 'D' comes from a practical limitation of the hardware used to implement the system (but again, less than 'D' groupings can be managed by a single Parallel String Controller).

Matrix 5: A single Parallel String Controller that is managing over '$D$' number of String Controllers.

$$PSC[1] \begin{bmatrix} SC[1][\ ] \\ SC[2][\ ] \\ \vdots \\ SC[D][\ ] \end{bmatrix}$$

Coordinator 'CD'
Coordinator Controls 'E' Number of Parallel String Controllers.

Matrix 5: A Coordinator controls up to '$E$' Parallel String Controllers.

$$\begin{bmatrix} PSC[1] \begin{bmatrix} SC[1] \begin{bmatrix} GC[1][\ ] \\ GC[2][\ ] \\ \vdots \\ GC[C][\ ] \end{bmatrix} \\ SC[2] \begin{bmatrix} GC[1][\ ] \\ GC[2][\ ] \\ \vdots \\ GC[C][\ ] \end{bmatrix} \\ \vdots \\ SC[D] \begin{bmatrix} GC[1][\ ] \\ GC[2][\ ] \\ \vdots \\ GC[C][\ ] \end{bmatrix} \end{bmatrix} \\ PSC[2] \begin{bmatrix} SC[1] \begin{bmatrix} GC[1][\ ] \\ GC[2][\ ] \\ \vdots \\ GC[C][\ ] \end{bmatrix} \\ SC[2] \begin{bmatrix} GC[1][\ ] \\ GC[2][\ ] \\ \vdots \\ GC[C][\ ] \end{bmatrix} \\ \vdots \\ SC[D] \begin{bmatrix} GC[1][\ ] \\ GC[2][\ ] \\ \vdots \\ GC[C][\ ] \end{bmatrix} \end{bmatrix} \\ \vdots \\ PSC[E] \begin{bmatrix} SC[1] \begin{bmatrix} GC[1][\ ] \\ GC[2][\ ] \\ \vdots \\ GC[C][\ ] \end{bmatrix} \\ SC[2] \begin{bmatrix} GC[1][\ ] \\ GC[2][\ ] \\ \vdots \\ GC[C][\ ] \end{bmatrix} \\ \vdots \\ SC[D] \begin{bmatrix} GC[1][\ ] \\ GC[2][\ ] \\ \vdots \\ GC[C][\ ] \end{bmatrix} \end{bmatrix} \end{bmatrix}$$

Up until this management level, each increasing management level has corresponded with a physical characteristic of the managed battery Pack. For example, a Group Controller managed a physical grouping of Energy Modules. A String Controller managed several physical groups to form a series String of Energy Modules (alternatively if a single String has too many Energy Modules in it, Sub-String Controllers are introduced to manage the several Group Controllers, at which point a String Controller instead manages several Sub-String Controllers as opposed to managing the Group Controllers). A Parallel String Controller in turn manages several physical String Controllers, which is essentially is the management of several physical Strings in parallel. A Coordinator would manage several Parallel String Controllers, which physically are several groupings of paralleled Energy Module Strings. However, after the Coordinator management level, every increasing level is essentially controlling groupings of other groupings below it. Therefore, the management levels above the Coordinator level are used to limit the amount of "direct reports" that will be seen by the highest management levels. Physically, this ties to the amount communication involved and how much traffic would be seen on a given communication bus.

Director-Level 1 'D1'
Director controls 'F' number of Coordinators.
Director-Level 2 'D2'
Director controls 'G' number of Director-Level{1}s.
.
.
.
Director-Level X 'DX'
Director controls 'Y' number of Direct-Level{X−1}s.
Master Controller At the very top sits a single Master Controller that watches over at most 'Z' number of management positions below them. Every application has a single Master Controller.

In a small application with only a single grouping of 'A' number of cells, the Master Controller can potentially be just a Group Controller.

The Master Controller can also be just a single String Controller, or a single Parallel String Controller, etc. . . .

Essentially, the Master Controller can be any of the management levels provided that it is only overseeing only 'Z' number of "direct reports" below it (where: Z≥F, Z≥E, Z≥D, Z≥C, Z≥B, Z≥A).

If there is more than 'Z' number of "direct reports", then that number of "direct reports" can be sub-divided amongst a level of Directors. If necessary the number of Director Levels may be added until the number of "direct reports" can be tied to a single Master Controller.

To accurately determine State of Health, State of Life, and State of Charge, parameters of a given Energy Module's internal energy storage device and an accurate model of the energy storage device's behavior is required. When using voltage as the only metric to determine these parameters in storage devices such as battery cells, it can be inaccurate due to the many factors that affect the voltage level—e.g. temperature, current consumption in and out of the battery, aging, manufacturing tolerances, and so on. In the present invention, the modeling method is not critical and any number of methods can be employed. An example of a modeling method is one described in U.S. Pat. No. 7,489,107 and it can be used for modeling these parameters. Inputs into the model are cell temperature, cell voltage, and cell current consumption. The outputs from the model are the parameters mentioned earlier (State of Health, State of Life, and State of Charge).

Figure 19:
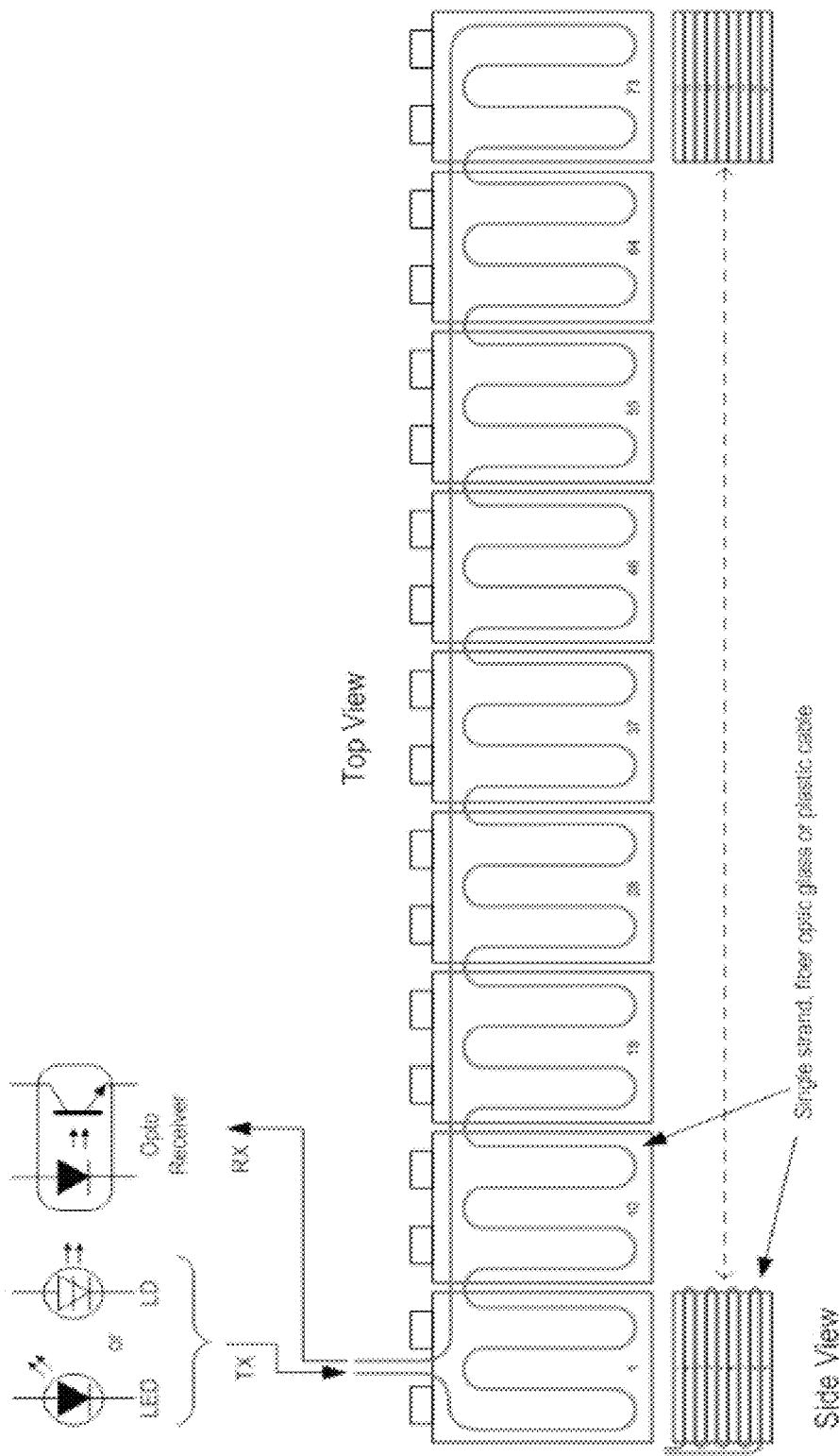
FIG. 19 is a diagram showing an optical sensor for sensing pressure in an Energy Module Pack.

Further, the isolated measurements for voltage and current are important for the present invention, but the system does allow for other supplemental measurements that can be used in determining the state of the health of the system. For example, it is possible to detect a faulted cell that is internally gassing and therefore expanding. This might be done by temperature measurement, fiber optic and other pressure sensors, gas sensors and other sensors but these sensors do not necessarily have to be isolated. Another approach might be to sense pressure or gassing from a faulted cell. FIG. 19 illustrates a real-time optical pressure sensor. It enables a high level of accuracy in pinpointing and isolating expanding or bulging cells. As shown in FIG. 19, optical fibers, which are either glass (silica) or plastic and have a transparent core surrounded by a transparent cladding material with a lower index of refraction allow light to be transmitted and kept in the core by internal reflection. Such optical fibers are well known in the industry. A single fiber optic strand is placed between all pouch cells and the outer casing of the housing container, and forms a continuous loop throughout the entire pack. When pressure is applied to the fiber, such as the expanding of the cell, the change will cause a change in reflection and the wavelength and/or the amplitude of the signal passing through the fiber optic strand. The signal is generated using a laser or LED diode and, when it reaches the end of the cable, is detected using an Opto Detector. Because of speed of the fiber optic signal, the signal is received and monitored in real time. Based upon the length of the fiber, it is possible to pinpoint strain, which isn't always possible using general measurements such as temperature, voltage, or current. This will translate into real time data about the expansion and deformation within a cell, and therefore act as an additional indicator of the state of its health. Neither an optical-pressure sensor nor a gas-leak sensor are critical to the "core switching functionality" but they can be employed as part of the overall control system.

The master controller therefore makes switching decisions from Energy Storage Device Measurements (e.g. Voltage and Current) and external inputs (e.g. pressure sensors, off gas sensors and temperature). The internal data are acquired in real time from our Energy Modules, firmware algorithms, etc. and external data is provided through direct connections to other sensor systems or via external communication interfaces such as the CAN port in the automobile industry or SCADA interface in the utility industry. So, the use of an additional or external sensor systems and/or control interface(s) can help make decisions eliminating individual or groups of cells or shutting the system down in an emergency situation. Thus, the present invention can service any cell and the control system of the present invention is adaptable to additional sensors and/or other external sources or control systems for decision making.

Figure 15:
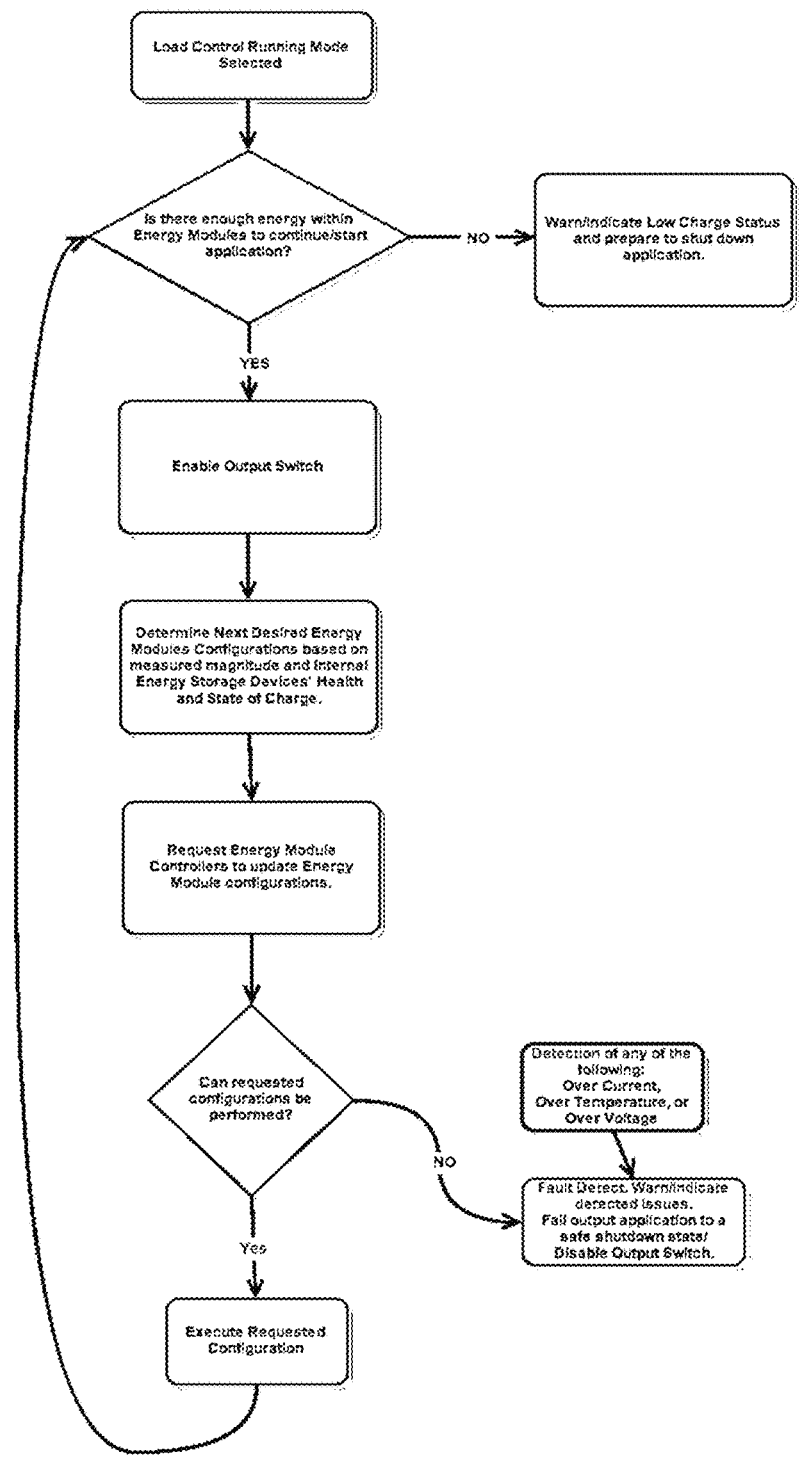
FIG. 15 is a flowchart of the Energy Module Pack operation as it is discharged.

FIG. 15 shows a flowchart of the algorithm used to manage an Energy Module Pack while it is being discharged into a load. A Master Controller will interface with the external application (e.g. in a golf cart application for example: the master would interface with an accelerator pedal and an on/off switch). Based upon the external applications energy requirement, the Master Controller will work together with its lower management levels (e.g. Parallel String Controller, String Controller, etc. . . . ) in order to determine the status of the Internal Energy Storage Devices within the pack of Energy Modules. Provided there is enough energy for the application to run, the Master Controller will continue to work with its lower management levels to configure the most charged Energy Modules to output energy to the application. If at any time, any of the Group Controller's detect an over temperature (higher temperature than recommended by Energy Storage Device manufacturer's ratings), overvoltage (higher voltage than recommended), or an overcurrent (higher current than what is recommended being drawn from Internal Energy Storage Device), a fault condition will be signaled. The controllers will work together to ensure that unhealthy characteristics (such as temperature or voltage deviates from expected for the Energy Storage Device's operation) are bypassed to allow the application to continue with the remaining functional Energy Modules.

The Master Controller will allow the application to continue running as long as there are enough Energy Modules with enough stored energy that can be configured to meet the demands of the application at hand. Throughout the discharging phase, the Master Controller will attempt to work with the lower management levels to ensure that energy output for the application is evenly distributed amongst the Energy Modules. This will ensure that the Energy Modules will be close to the same energy levels as the application is run. When the energy levels of all Energy Modules hit a low threshold as determined by the Energy Storage Device Manufacturer, the Master Controller could also continue running the application, but with reduced performance. This would be favorable in some applications such as a golf cart with low energy. A user in this application might want to continue running but at reduced speed to allow him or her to get back to a charging station. If the application can no longer run without over drawing energy from the Internal Energy Storage Devices, which would cause damage to the Energy Storage Devices, the Master Controller will disable the application until a charging source can recharge the Energy Module Pack.

Figure 16:
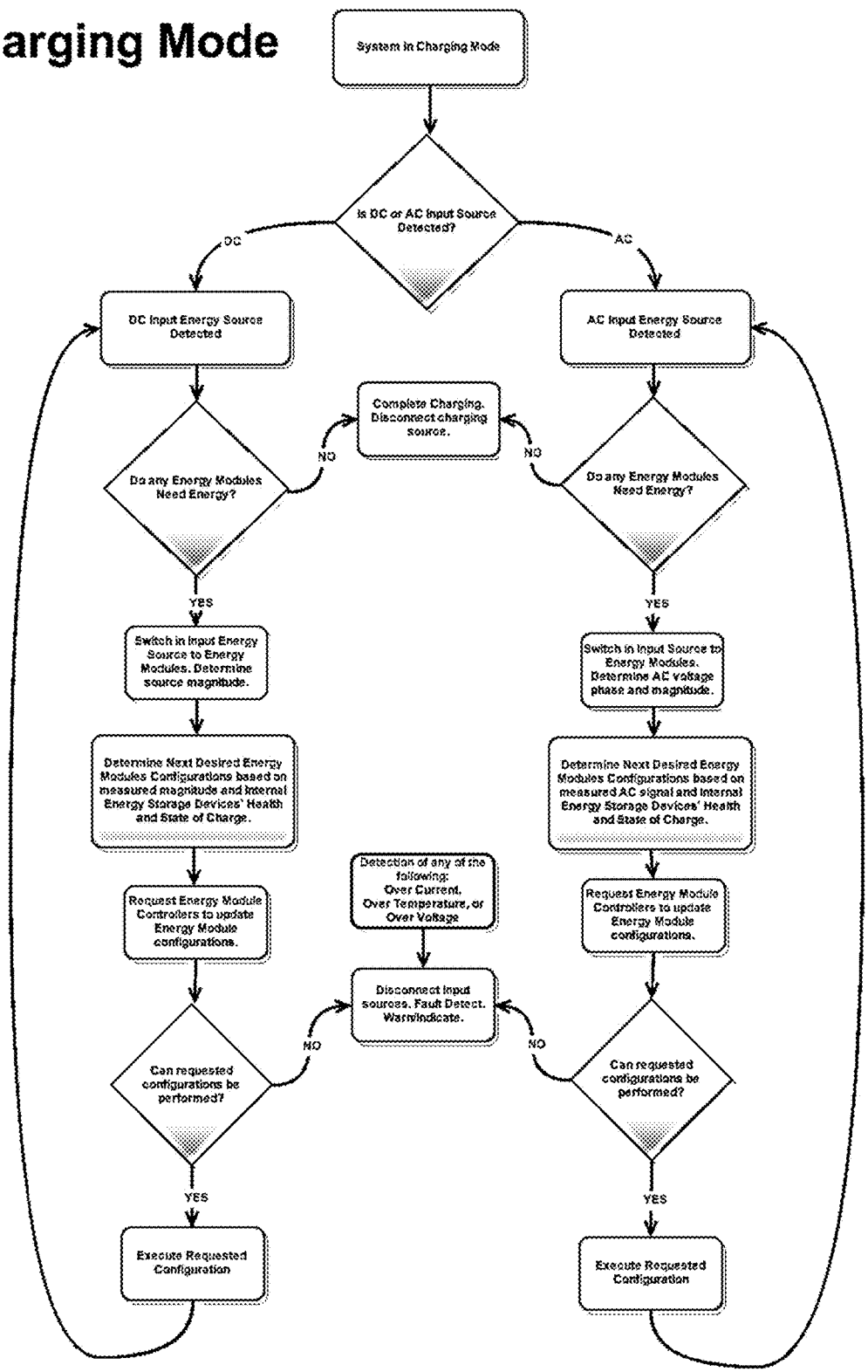
FIG. 16 is a flowchart of the Energy Module Pack operation as it is charged.

FIG. 16 shows a flowchart of algorithm used to manage the Energy Module Pack while it is being charged from an energy source. Similar to the Discharging of the Energy Modules, the Master Controller will interface to an Input Energy Source. The Master will determine whether the source is AC or DC and what magnitude and phase in the case of an AC input or just the magnitude if it is a DC input. If the Energy Modules can be configured to accommodate the incoming energy source, the Master Controller will work with its lower management levels to configure the Energy Modules to accept the input energy source.

The Master will then enable the input energy source by switching it into the configured Energy Module Pack. The Master Controller and the lower management levels will constantly re-configure the Energy Modules in order to regulate the energy coming from the input source. The Master and the lower management levels will work together to ensure the incoming energy is evenly distributed amongst healthy Internal Energy Storage Devices within the Energy Modules. This will continue, until all Energy Storage Devices within the Energy Modules are charged to their manufacturer recommended full potential. Also, the same fault conditions as mentioned in the Discharging description of over temperature, overvoltage, and over current will be detected and handled in the same manner. If an Energy Module is detected to have a faulted Internal Energy Storage Device, the Master will attempt to continue operation of the Energy Module pack by isolating and limiting usage of any faulted Energy Modules.

Figure 17:
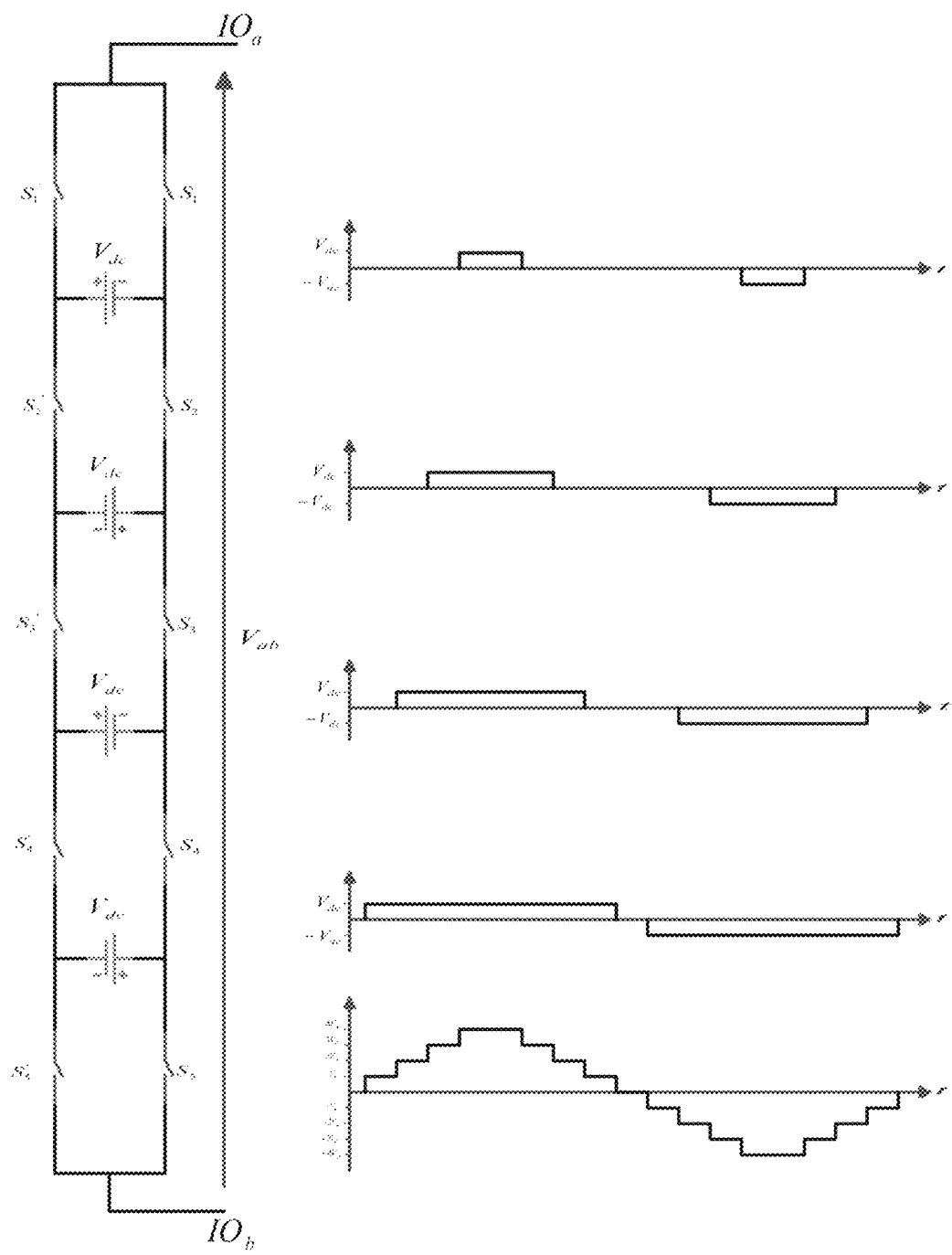
FIG. 17 is a schematic of a generalized stepped-waveform.

The system generates an AC output based on the same principles as a digital to analog converter, where individual cells are stacked to create a sine wave output. The control of the switching for this process is critical—thus leading to the importance of software algorithms. The cells are connected by switching and controlling the configurations of Energy Modules within a grouping of Energy Modules. An EM-AP configuration is shown in FIG. 17 that demonstrates 9 possible output levels that when timed and configured to output the proper voltages, form a sine wave from the output terminals of the grouping of Energy Modules. In the example shown in the figure this is done with utilizing 4 energy storage devices, however, any number of energy storage devices may be used to increase the voltage magnitude of the sine wave. As it is obvious, the sine wave can also have a desired frequency by simply controlling the timing of the switches. In this method, a variable frequency is achieved by controlling the switching, and so any frequency may be generated (i.e. 60 Hz, 50 Hz, etc). By controlling the switching and carefully managing the charge and discharge process according to the specifications of the selected energy storage device, charging and discharging can be performed without damaging the cell. So, this method can assist with standardization and certification. Previously, once a power supply was certified it could not change. Thus, the present invention will reduce the need for external energy controllers, such as motor controllers and inverters. With the ability of changing frequency and voltage, the present invention can remove the need for a motor Controller or other inductive loads, remove the need for an external charger, charging station and/or dedicated charging infrastructure, and can remove the need for a charging control device.

Current systems do not tolerate non-performing/failing cells. This implies that a single cell failure often results in the disconnection of an entire String with the consequence of losing system functionality, thereby leading to the need to replace an entire Pack. With the present invention, the ability to completely "swap-out" or not-use a bad cell is possible in software alone. With this ability, the life of each individual cell may be prolonged, and therefore, the life and reliability of the overall system. The system can also eliminate defective cells from the Pack and report on all such failure conditions for appropriate corrective action(s). This illustrates the application of a pyramid switching structure for the purpose of battery management.

As an example, consider using the pyramid system mentioned above, with 9 batteries. If cell #1 is at 100% state of charge, cell #2 is at 88%, and the remainder is at 90%, the amount of time that the "lower" cells are used can be controlled. That is, an Energy Module containing an energy storage device with a lower state of charge will be switched out from the Pack and utilized less than Energy Modules with higher charged energy storage devices. This is continued until the lowest charged Energy Module is no longer the lowest charged. Continuing the operation in this way will allow the Application's energy requirements to be provided by the highest charge Energy Modules until the Energy Modules become balanced. This balancing algorithm takes each energy storage devices' voltage, temperature, and operating current as an input and outputs a battery health index and the available energy. Using the output information, the management algorithm ranks the batteries and puts them into the organized slots to maximize the health and longevity of the entire "power supply" (battery Pack). Similarly, additional sensors can be added to aid the core control and management system such as gas monitoring, cell expansion, etc.

FIG. 1 shows options for additional isolated switches 15 and 16 which provide a method of fault protection in battery packs to enable pack functionality after fault. The circuit shown in FIG. 1 is composed of two additional mechanical switches for use in applications that require additional fault protection. In this configuration, any Energy Module can be completely removed from use with the rest of the battery Pack. These additional switches are powered from an auxiliary power supply and would be normally closed and latching (for lower power consumption). The two mechanical switches consist of the switch in series with the cell and another switch to bypass across the inverted H-Bridge as a whole. This would ensure that if any switch within the inverted H-Bridge Module were to fail, the cell could still be isolated and allow the rest of the Energy Modules connected in a given String to continue functioning until the faulted Energy Module could be addressed.

The present invention provides a communications protocol to enable a dynamically reconfigurable energy storage device. If the subsequent method is not employed, the aforementioned capabilities may not be possible. Timing is an important component of the present inventions functionality. For instance, if a switch is opened while a single cell is also opened, the full Pack voltage will be present across a single switch, therefore causing a system failure. Issues of timing are partially handled by the previously detailed management architecture. Within this system, latency will be added to account for the addition of Energy Modules. Additionally, a timing strobe must be employed by the Master Controller to ensure each subsequent Controller (Director, Coordinator, and so on) are on the same schedule and communicating. The protocol will have both a long and short Packet in which the long Packet passes important information and the short Packet passes information as quickly as possible.

Long Packet would function as follows:
Master Controller
  1. End of Packet
    a. Make sure when a Packet is sent everyone resets.
  2. Module Identifier
    a. This is a serial number that is given to the Modules by the manager.
    b. 2 bytes
  3. Long Packet code
    a. 2-4 bytes
  4. Number of bytes sent
    a. One byte
  5. Date/Time
    a. 4 bytes
    b. This is only important if the cells have an RTC
  6. Action code
    a. Read Data
    b. Write Data
    c. Report Status
    d. Kill Cell
    e. Kill Module
    f. Read temp
    g. Read Voltage
    h. Read Current
    i. Read SOC
    j. Reset Sync count
    k. Read sync count
    l. Resend last message
  7. Data for Action Code if any
  8. Checksum or Hash
  9. End of Packet
Slave
  1. Number of bytes sent
    a. One byte
  2. Confirm Action Code
  3. Data to report
  4. Checksum or Hash
  5. End of Packet
Short Packet Description
Master Controller
  1. Module Identifier
  2. Short Packet code
    a. 1-2 bytes
  3. Short Action Code
    a. Kill Cell
    b. Kill Module
    c. Kill Pack
    d. Set new pyramid position
    e. Active pyramid position
    f. Set number of cells for pyramid
Slave
  1. Managers identifier
  2. Short Packet code
  3. Acknowledgement
    a. Message received and implemented
    b. Message received but could not be implemented
Action Code Description The following is a list of all of the "long" action codes and what they do:

Read Data—(0x01): This code will request data from the Master Controller to the Module to request information. This is reserved for general data.

Write Data—(0x02): If it is found that the general data is incorrect on the Module then the Master Controller can change or correct the data.

Report Status—(0x03): This will give the current status report of the Module as requested from the Master Controller.
  a. Return codes
  b. All is OK
  c. Have cells low
  d. Cannot produce voltage required
  e. Have dead cells Kill Cell—(0x04): This will give the Master Controller the ability to remove individual cells. This should be left to the String to decide because the Module has all of the information. This is reserved for an emergency.

Kill Module—(0x05): This is the kill String signal. This is given for emergencies or when it is required to shut down the String. It would be better practice to use a short code in emergencies to have it shut down faster.

Read temp—(0x06): Get the temp from the String. This can be used by the Master Controller to report and only act on in an emergency.

Read Voltage—(0x07): Read the full voltage of the String. This can be used by the Master Controller as a rough estimate of how many cell should be assigned to the String to acquire the Pack voltage.

Read Current—(0x08): Get the current that the String is discharging. This may or may not be implemented. The overall system may have current reading at the Master Controller level (charging Level) or at the String level.

Read SOC—(0x09): Give the SOC of the String. This will help the Master Controller to "load" the Modules with the correct amount of cells to reach the voltages required.

Reset Sync count—(0x0A): All of the Strings will maintain a counter of the current sync count. The Master Controller can reset the sync count for a special instance.

Read sync count—(0x0B): This gives the Master Controller the ability to view the current sync count of the Strings to make sure they are synced correctly.

Resend last transmission—(0x0F): If the checksum or hash did not line up then the master can request another response.

The following is a list of all of the "short" action codes and what they do. The short action codes are meant to be quick Packets that can be passed with low latency:

Kill Cell—(0x04): This will give the Master Controller the ability to kill (stop using) individual cells. This should be left to the Module to decide because the String has all of the information. This is reserved for an emergency.

Kill Module—(0x05): This is the kill String signal. This is given for emergencies, or when it is required to shut down a given String.

Kill Pack—(0x0C): This code will be broadcast to all String on the party line to kill each.

Set new pyramid position—(0x0D): Tell the String what position they are in the pyramid Active pyramid position—(0x0E): This will return the active position of the String to confirm that the Module is in the correct location in the pyramid.

Set number of cells for pyramid—(0x10): This will tell the Energy String how many cells will be active in the pyramid. For example, if this number of cells is 2 then at the most only 2 of the 11 cells in the Module will be on at a time.

Action count—(0x11): This is the sync count in the future that the new configuration will change to when the sync count=the action count.

Cancel action count—(0x12): This will cancel the previous action count and no changes to current configuration will be made.

Figure 18:
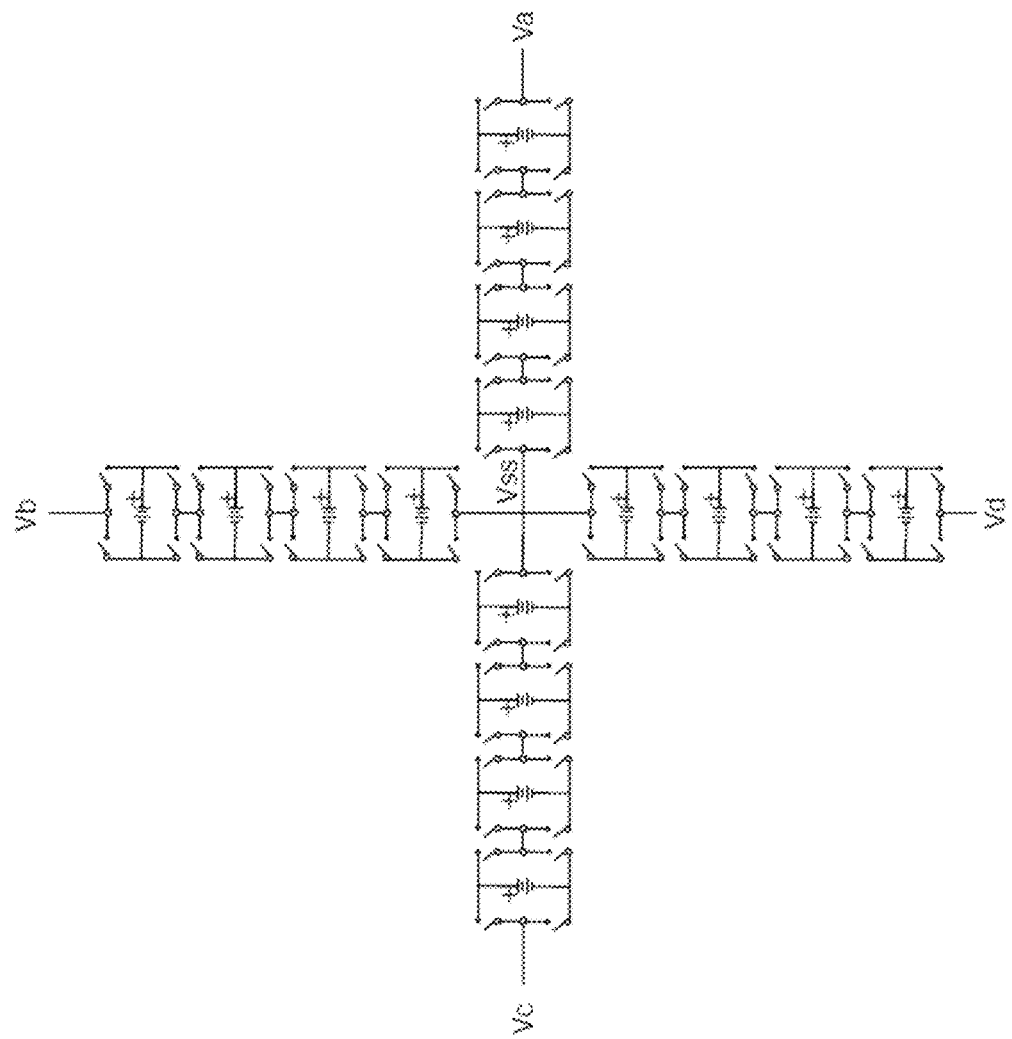
FIG. 18 is a schematic showing multiple series connected Energy Modules with a common reference point which allows for the capability of variable DC sources.

A Method of Creating Multiple, Variable, DC Sources from One Battery Pack or Multiple Phase AC Source FIG. 18 illustrates the application of the present invention for the creation of multiple, variable DC sources or a Multiple Phase AC source. To create multiple, variable DC sources by the present invention, a midpoint is selected within a String of Energy modules—this point is then established as a ground point. To the right of this ground point, the modules may be changed from the range of +Vdc_A to −Vdc_A, while the left can be switched from +Vdc_C to Vdc_C to establish multiple variable DC sources from a common reference point. Above and below the ground point, the following voltages are obtained, +Vdc_B to −Vdc_B, +Vdc_D to −Vdc_D, respectively. Without loss of generality, it is possible to have the magnitudes of Vd_A to be the same or different than the magnitudes of Vdc_B, Vdc_C, or Vdc_D.

Examples applications of this method include:
a. A four-wheeled vehicle with direct motor drive on each wheel being independently driven by this hardware configuration.
b. Any system with various voltage requirements.
c. To create a three phase AC source, Vss can be utilized as a neutral line while the energy modules in Va, Vb, and Vc can be controlled to generate AC sine waves with the desired phase offsets between each of the AC signals.

Example of an Application Utilizing Fail-Safe Methods & Additional Local Energy Storage Devices with an Energy Module Pack:

As an example, take a Five Energy Module series connected String as shown as a scaled version of FIG. 2. In this example assume each Energy Module has Lithium Cells for their Internal Energy Storage Device. In this example, each Energy Module has the additional Local Energy Storage Device and the circuitry as provided in FIG. 6. The Local Energy Storage Devices for each Energy Module is simply a capacitor. If the Lithium Cell within the Energy Module is functioning normal and with high enough stored charge, it will transfer energy to the capacitor. A computational device, such as a microcontroller, then provides the two isolated control signals to each Energy Module to change each module's output configuration as desired. Provided that each Lithium Cell continues to operate normally and has high enough charge, the switch driving circuitry can continue to operate properly. However, if one of the Lithium Cells fails in such a way that prevents enough energy to be transferred to that Energy Module's corresponding capacitor via the diode path, the Energy Module's power switches will lose their proper biasing. If the switches proper biasing are not met properly, reliable control over the power switches would not be achievable. This is where the ability to transfer energy through isolation from the microcontroller to an Energy Module's Local Energy Storage Device is beneficial. This would allow the Power Switches to be controlled in the event some type of Internal Energy Storage Device failure occurs. In this example, if one of the series connected Energy Module's Lithium Cells were to fail without the additional Local Energy Storage Device available to power the switch driving circuitry, that particular Energy Module could not be placed into a bypass configuration. If this were to occur, the entire String of Energy Modules would be broken at that failed Cell and no output would be available at the overall Energy Module's String Output Terminals (the output terminals on each end in FIG. 2). In addition to being able to continue operation of Power Switches in the event of a failed cell, further fault isolation may be desired in certain applications (e.g. applications that have intrinsically-safe fail-safe specifications such as military and medical, or applications with cell chemistries that are likely to experience thermal runaway). In this example, complete isolation could be achieved with a faulted cell by providing a Normally-Closed Mechanical Switch in series with the Internal Storage Device as demonstrated in FIG. 1. In the event of a cell failure the series connected switch could be forced open to isolate the cell by the managing microcontroller. This would be at the cost of additional power consumption, but would allow the faulted cell to be completely removed. If the faulted cell is isolated and removed via the series connected Normally-Closed Mechanical switch, the now faulted Energy Module can be bypassed using one of two options. The first option is to continue utilizing the Locally Powered Power Switches as explained above to configure the faulted Energy Module into the Bypass State. The second option, a Normally-Open Mechanical switch in parallel with the Energy Module (at the bottom of FIG. 1), could replace the first option or be used as a redundancy to ensure that the faulted Energy Module is bypassed. Again, just as in the case of the series connected Normally-Closed Mechanical Switch, this second Mechanical Switch would also be employed at the cost of additional power consumption.

Another Example of an OEM Application with Energy Modules:

A Golf Cart can be powered by an electric battery. The energy source is presumed to be an onboard energy source that is charged from either a 120 Vac source or 36 Vdc solar panel and rated for 36V motor operation. A series connected set of 60 energy modules are utilized and the internal energy storage devices within the energy modules are battery cells that are nominally 3.3V. If 52 of the 60 Energy modules were connected in series via the proper switch configuration, the maximum nominal voltage obtainable would be 171.6V. The additional 8 Energy Modules allow for redundancy in the event a cell is in a bad state-of-health and also allows more flexibility when it comes to balancing out state-of-charge of cells. The nominal value of 52 Energy Modules allow the grouping to be directly connected to a standard 120 Vrms AC outlet and with proper switching of each energy module as shown in FIG. 17 (a scaled-down version of the same concept), they can charge directly from the AC source. The architecture for managing these 60 energy modules is given in the following description.

The energy modules are sub-divided into 5 groups (with 12 energy modules per group), each being managed with one group controller. The grouping of 12 is arbitrary in the sense that circuitry designed for the group controller would have a practical limit on how many energy modules the group controller would be managing. In any case, in this example there are 12 energy modules managed by a single group controller. Each group controller will know the condition and state of charge of the energy storage device within each energy module that the group controller is managing. A single string controller in turn will manage the 5 group controllers. The string controller will interrogate the group controllers for information about each of their energy modules. The string controller would manage where incoming and outgoing energy is transferred and to which group controller's energy modules it will be directed to or from. At the top of the management structure is the master controller, which will interface directly to the string controller. The master controller will provide the string controller with information on incoming energy from external sources or demands for outgoing energy. More in depth descriptions of the charging and discharging processes are provided in the following sections.

When in charging mode, the master controller will monitor the input energy source terminals for available energy. It will determine if the source is either AC or DC and sample the voltage magnitude. Once the master controller determines the type of input source, it will begin to interface with the string controller, which in turn interfaces with the group controllers, to apply the appropriate algorithm to distribute charge to the individual energy blocks. The overall goals of these algorithms are to charge each energy storage device to its optimum charge level. This is done by monitoring each energy storage device's state-of-charge, its health level (i.e. that the cell's voltage and temperature are within acceptable ranges), as well as monitoring the input source energy's present voltage magnitude. Taking this information into account, the master controller will command the string controller to create a certain configuration to accommodate the input energy source. The string controller in turn will request the group controllers to manage their own energy blocks (by commanding each energy module to be either Bypassed, Positive Polarity or Negative Polarity) and verify that the request was successful. This repeats until the energy blocks have internally charged their energy storage devices.

When in discharge mode, the master controller will interface with various command signals. Namely, the brake signal (applied or not applied), the accelerator (analog signal that correlates with how far down the accelerator is depressed), and the forward or reverse switch (indicates the desired golf cart direction). When the master controller determines that the accelerator is depressed, it will check the direction. Then depending on how much the accelerator is pressed, the master controller will request the string controller to connect enough energy modules in series and direct this energy via a switch to drive the motor. The polarities in which the energy modules are connected are dependent upon on the direction switch (e.g. if the direction is forward, the Energy modules would be connected positively, and if the direction is backward they would be connected negatively). The number of energy modules connected would be dependent upon how far down the accelerator is depressed. The String Controller will choose the highest charged energy modules to generate the desired voltage to drive the motor. The master controller will request the string controller to only apply voltages approximately in the range of (0 V to 36V). After this request is provided to the string controller, the string controller will then interface to the group controllers to determine which cells can provide the desired output. The request will be made between the group controllers and the string controller and the string controller will notify the master controller that the requested command was successful. If the string controller does not reply within a predetermined amount of time, the master controller will attempt to interrogate the string controller for potential faults to be able to provide the user with possible fault/error conditions (e.g. failed energy storage device, low charge, high temperature, and the like).

Figure 20:
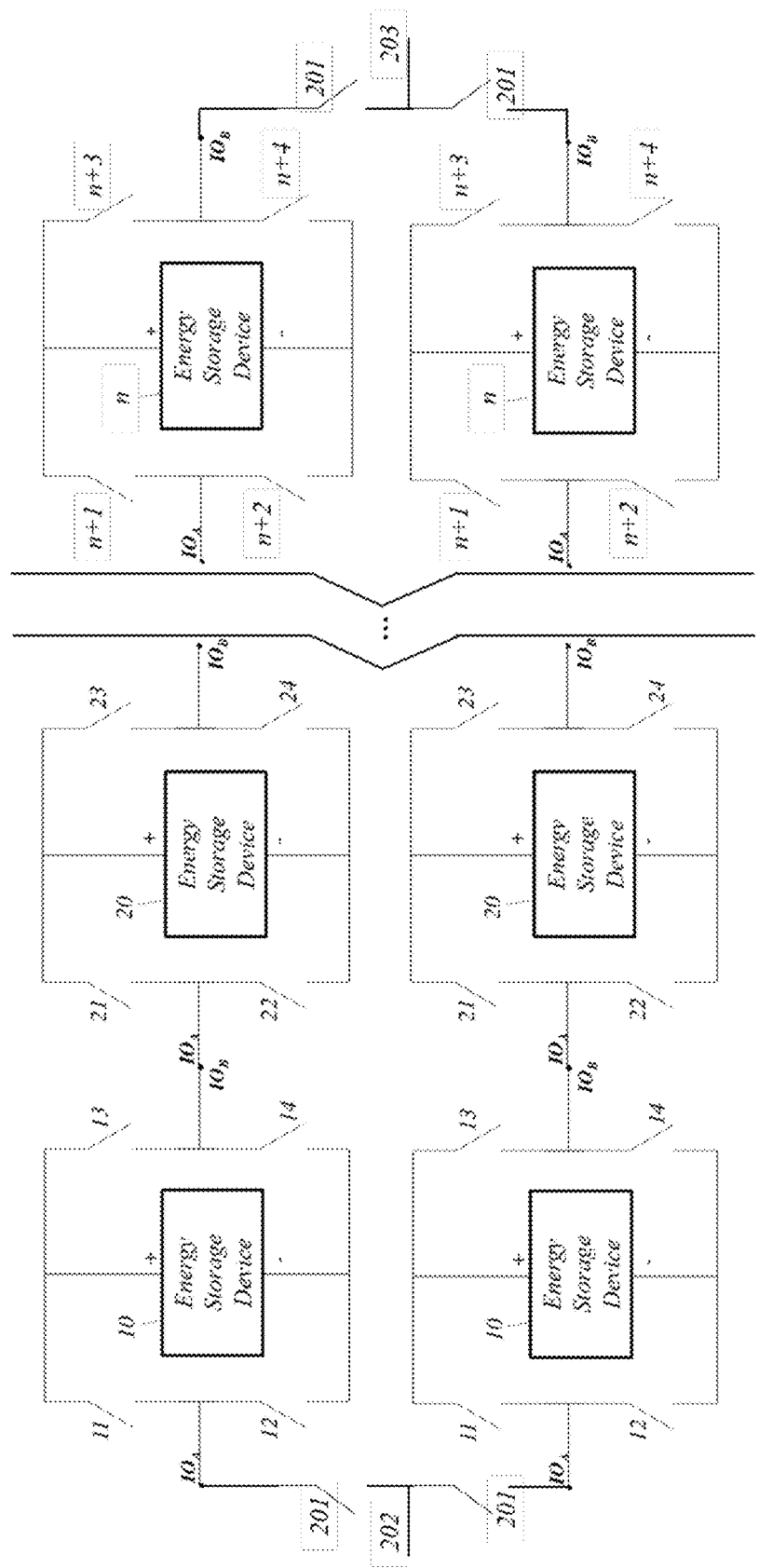
FIG. 20 is a diagram illustrating the connection of two Series-Connected Energy Modules connected in Parallel.

The following set of charging examples is provided to demonstrate the flexibility of charging with the present invention. For these charging examples the following parallel Energy Module configuration is used:

The example are based upon the two Parallel-connected Grouping of Series connected Energy Modules as shown in FIG. 20, with each String containing a generic number, n, of Energy Modules. Although the EM-IH system will be discussed, this will also apply to the EM-AP system. Regardless of the type of Energy Module configuration, this system would be controlled with the Control Hierarchy as discussed above. FIG. 20 shows 2 additional switches for each of the two Grouping of Series connected Energy Modules, on each end, designated as 201. These additional switches allow the Master to control the connection of each Parallel String to the overall configurations output designated by 202 and 203.

Charging with an AC Source

The charging source may be an AC Source, or DC source. In the event of the AC source, the Master device could be placed into an AC charging mode that would detect the magnitude of the AC source and control the Energy Modules to match and charge from the AC source. As disclosed, pulse-width modulation of individual Energy Modules can be employed to track the input AC source, which allows the architecture to control the charging current into the Grouping of Energy Modules. This is under the assumption that the number of Energy Modules, n, is large enough to match the AC source's maximum voltage magnitude.

Charging with a Fixed DC Source

In the event of a fixed DC input charging source, the source may be a fixed DC charging device (e.g. such as a commercially available Lithium cell chargers). The master can placed into a mode that will allow it to detect the magnitude of the DC source. Once it detects what's the maximum Voltage from the DC source it can determine the maximum number of series connected Energy Modules it can charge at once. Then in this example, that maximum number of series connected Energy Modules would be chosen in each parallel string of Energy Modules. Then both sets would be connected in parallel via the parallel connection switches. The Master can then change the sets of Energy Modules in a round-robin fashion, interchanging Energy Modules as necessary based off of their state-of-charge and state-of-health, to optimize the charging of all Energy Modules.

Charging with a Varying DC Source

In the event of a variable DC source such as from a Solar Panel or Wind turbine, the Master could be placed into a mode that would allow changing the charging voltage of the DC source to maximize the incoming current. Essentially, by maximizing both the current and voltage, the maximum power available is also achieved. This is also known as "Maximum Power Point Tracking" or also as "Matching the Characteristic Impedance of the Input Source" in the industry. Typically, maximum power point tracking is accomplished through use of control circuitry which varies the duty cycle in a DC-to-DC switching converter to match the panel to the battery pack given sensed parameters of each. By connecting to the input DC source a given number of series connected Energy Modules and then measuring the incoming current and the voltage of the series string, the Master can determine the Power for that number of Energy Modules. Then simply by increasing or decreasing this number and repeating the current and voltage measurements, the Master can compare the available Power at each number of series connected Energy Modules. The Master can continue searching in this manner to find the number at which the incoming power is highest. Optionally, to increase the resolution in finding the maximum power operating point voltage, the Master can start to PWM individual Energy Modules to make the input DC source operate between a voltage that is between two Energy Modules. This is a new method of Maximum Power Point Tracking inherent with the present invention.

Charging from Wireless Charging Systems

The present invention may be further applied with a variety of wireless charging systems, including inductive, resonant inductive, and Radio Frequency (RF). In this application, the invention may either interface to the wireless power receiver's power conversions stage (e.g. diode rectifier or charge pump), or can alternatively be integrated with the design of such a system, with a direct interface to the energy harvesting device (e.g. loaded coil or antenna). Much like in the case of the charging with a "Varying DC Source" in the previous section, the Grouping of Energy Modules can dynamically reconfigure the overall grouping's series voltage and determine the source's current and again, maximize the operating power point. This is critical when interfacing with RF or inductive charging systems.

Charging from Another Grouping of Series-Connected Energy Module String

Two independent Grouping of Series-Connected Energy Module strings could be connected as if they were connected in parallel as shown in FIG. 20. For the sake of discussion one Energy Module Series-Connected String will be designated as String-1 and the other as String-2. Provided that the combination of one or more energy storage devices in String-1 has a higher potential than any individual energy storage device in String-2, energy can be transferred from String-1 to String-2, and vice-versa. An actual example could be the battery system in two electric vehicles, both containing the present invention, could exchange energy if one of the two battery systems were running low on energy. The Master in each battery system could be placed in a mode that would allow the co-operative exchange of energy between the two systems. The Masters would simply need the direction of the energy exchange. Due to the flexible nature of the present invention, the two systems do not need to have the same number of Energy Modules or same size Energy Storage Devices. Each system could modify the number of energy modules connected in series to perform the exchange. This discloses the concept of exchanging energy between two Energy Module based systems however, this could be done with more than two Energy Module based systems simultaneously as well.

Two Switch Embodiment

Figure 21:
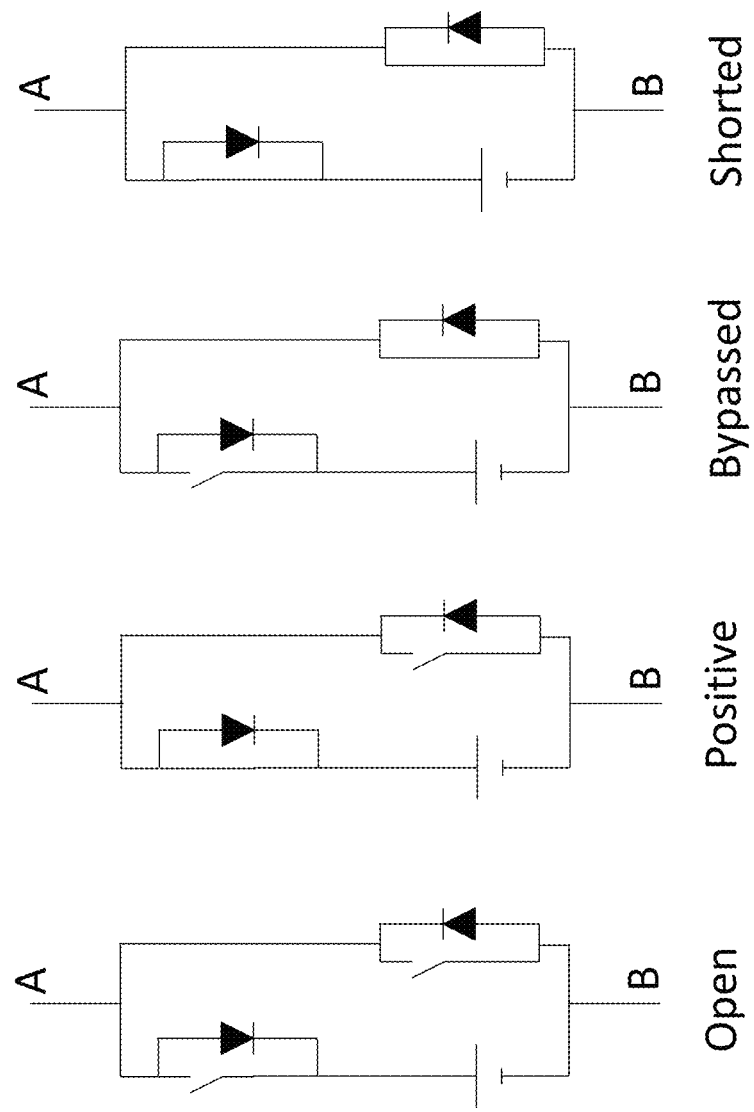
FIG. 21 is a diagram illustrating the connection of a two switch design to provide positive, bypass, open, and short connections.
Figure 22:
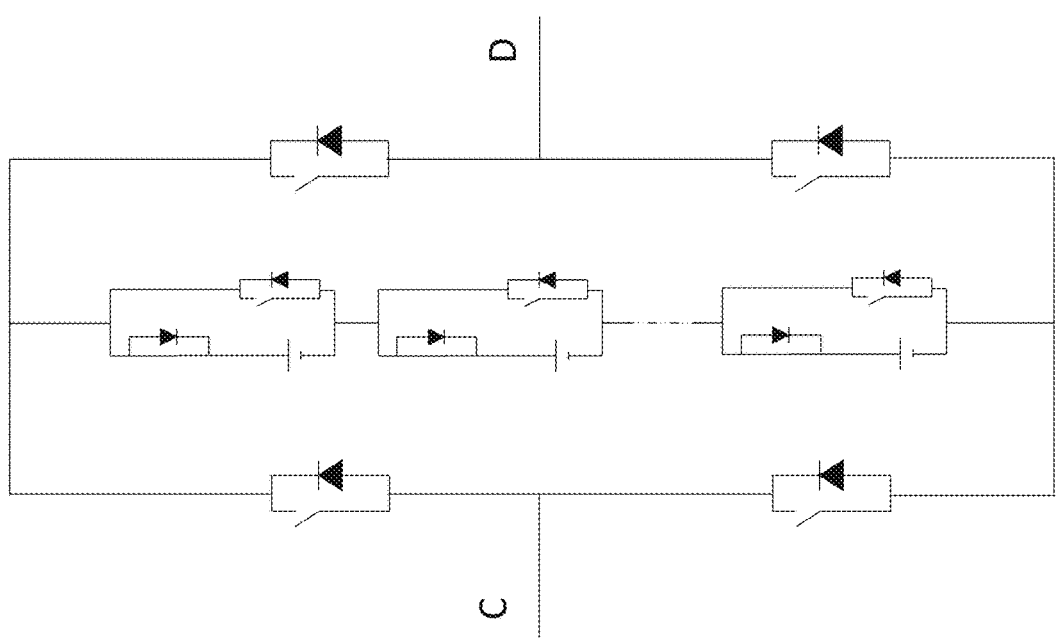
FIG. 22 is a diagram illustrating the connection of two switch two switch modules around a four switch inverted h-bridge.
Figure 23:
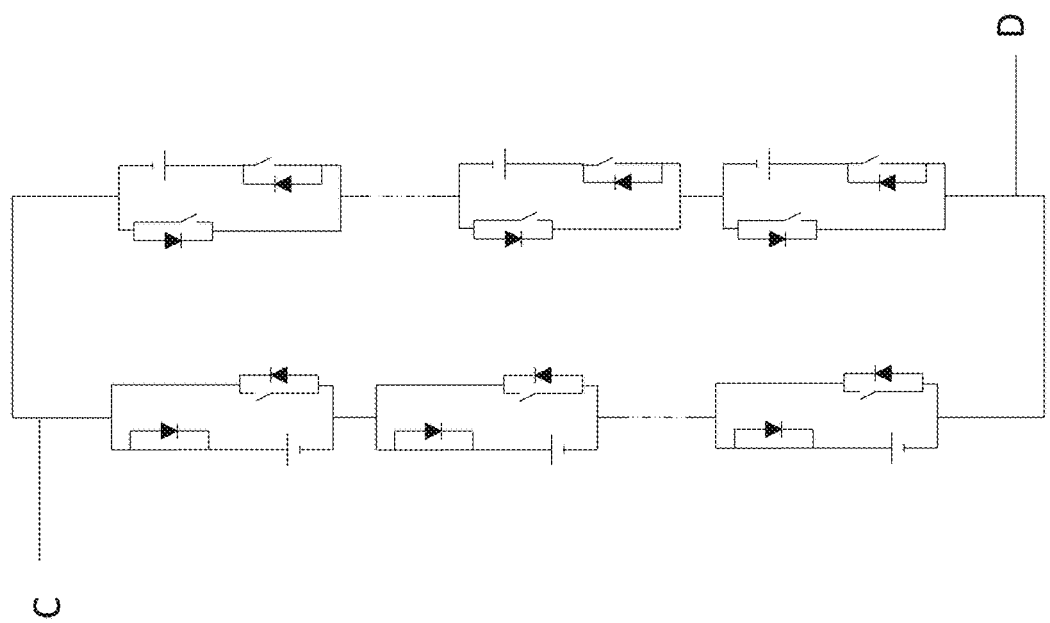
FIG. 23 is a diagram illustrating the connection of two groupings of two switch modules connected together.

As can be seen in FIG. 21, the two switch embodiment enables four configurations, namely Positive, Bypass, Open, and Short. Negative can be achieved in one of two ways. As seen in FIG. 22, by placing a single 4-switch inverted h-bridge configuration around a series-string of 2-switch modules, the series-string of 2 switch modules can be controlled to achieve a variable DC output. In conjunction with the additional inverted h-bridge module enveloping the series-string of 2-switch modules, negative, positive, bypass, open, shorted can be provided across input/output ports C & D. As seen in FIG. 23, using two groupings of 2-switch modules connected together by a series-connected string of 2-switch modules and paralleling it with another inverted series-connected string of 2-switch modules, one can create a positive output, one string connects to the input/output ports C & D to create the positive output while the other inverted series-string leaves its switches in the Open state. Similarly, to create a negative output, the inverted series-string connects to the input/output ports C & D while the non-inverted series-string leaves its switches in the Open state.

The two switch configuration can provide efficiency and cost reductions over the "4 switch method" and removes the limitation of having to bypass two consecutive switches of the 2 switch method with alternating polarity cells. Thus, a 2-switch configuration with the same outputs/inputs adaptation can be achieved by varying the 2-switch modules (e.g. DC output, DC input, DC variable output, AC input/output with variable frequency.

Figure 24:
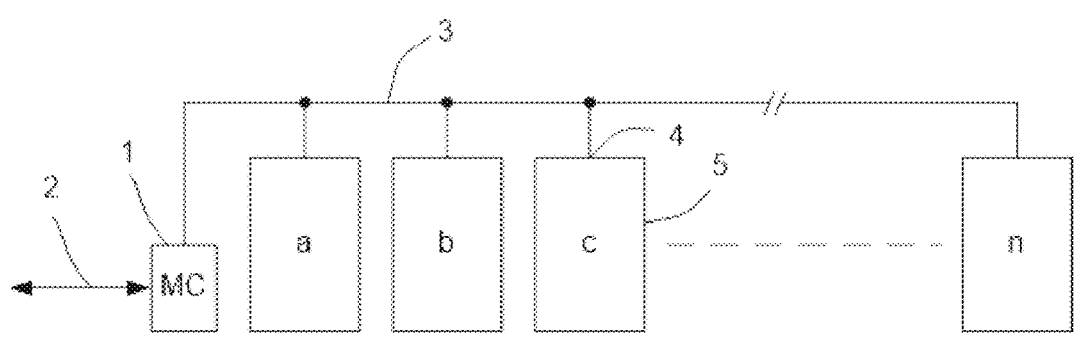
FIG. 24 is a diagram illustrating the connection of a two switch control system architecture.

As seen in FIG. 24, the control system architecture would include a master controller 210, which is shown in serial interface 212, with the rest of the system, and includes a digital bus interface 214, which connects each of the switch and cell node 218. The switch and cell nodes are connected via an optic-coupling interface 216. The number of switch and cell nodes can be indefinite as is schematically illustrated starting with node "a" and continuing through number "n".

The use of a two switch configuration would result in using fewer switches, which means higher efficiency, by approximately 50% of the 4 switch method, less cost, fewer switches to purchase to accomplish same functionality, less auxiliary components (e.g. switch drivers and input/outputs from controlling devices), less thermal cooling needed since efficiency is higher, and less circuit board space, which would allow the board to shrink in size.

The present multilevel converter, inverter and power management system can dynamically control charging and discharging of highly integrated systems. The possibility of simultaneously charging and discharging a lithium battery pack or a super-capacitor bank has broad applications. In addition, the system may incorporate operational feedback or integrated control with an external power source, the load and/or from internal or external sensors enabling a new level of dynamic control features providing expanded system functionality. Such dynamic control and operational flexibility, combined with interconnecting and scaling of multiple systems in series or in parallel, may allow for many different use-applications of the technology.

Further dividing the modular storage converter and power management system into two or more strings operating under dynamic control within an integrated system allows for many more use applications including simultaneous charging and discharging, transformer-less charging from a 3-phased AC power source or discharging into a 3-phased AC load, to name a few examples.

Dismantling or reconfiguring such multi-string functional system and combining these same strings for higher input voltage may enable ultra-fast charging of the entire pack from a high-voltage charging station or a high-voltage photovoltaic solar array. Yet, this same system may also deliver a higher output voltage to be discharged into a load, which, for example. allows for fast DC charging of another pack, or a stalled electric vehicle. Alternatively, discharging the combined strings at a lower voltage may allow for longer run-time charge applications.

Operating multiple strings within a system, one string could be a battery string and the other a super-capacitor string, and therefore the system can deliver both high-peak power and long-time energy discharge. Such hybrid system can be used for power grid management, cold-starting a large diesel engine generator, or feeding other large in-rush loads, for example.

Figure 25:
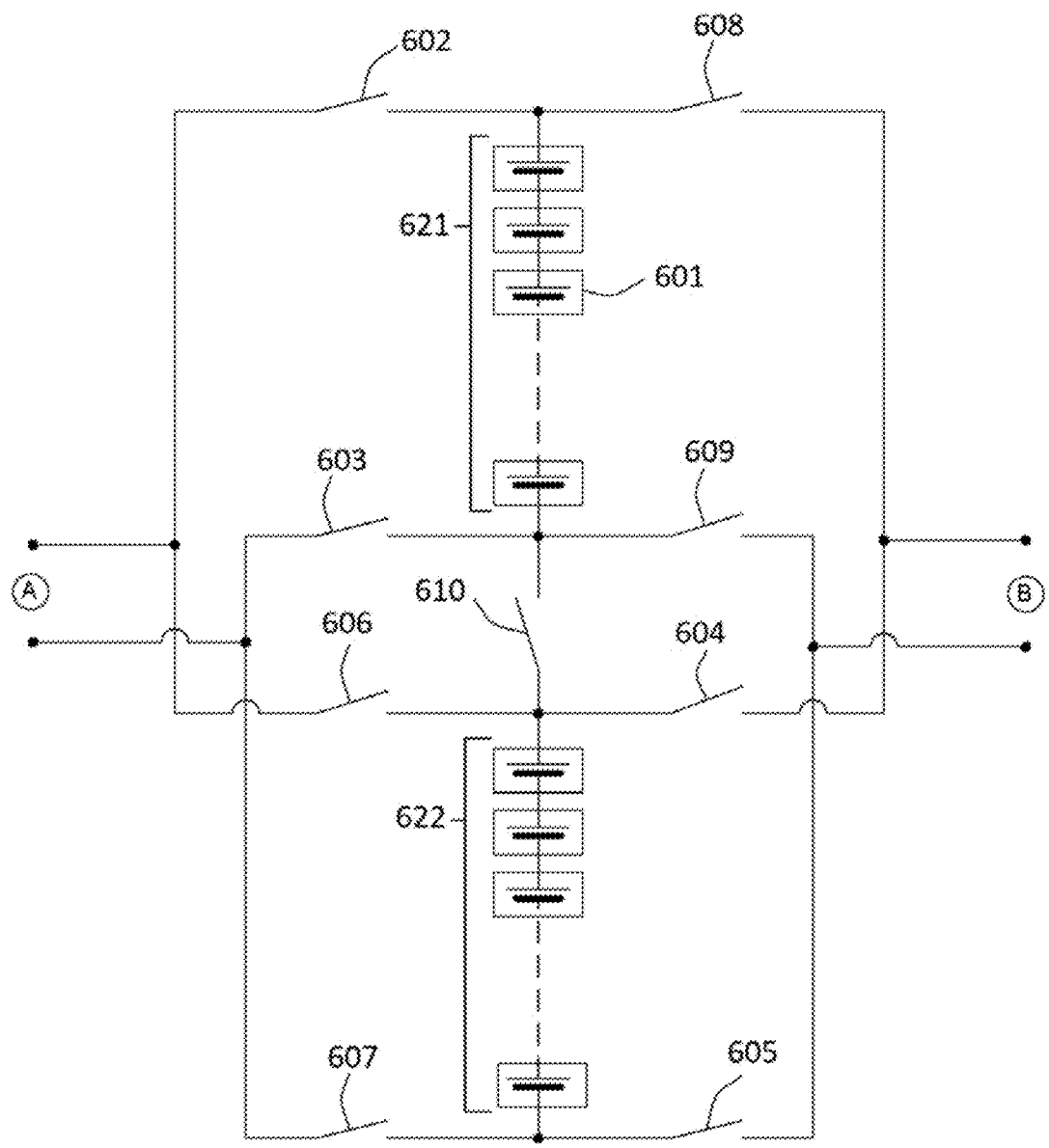
FIG. 25 is a diagram illustrating a simultaneous charge and discharge configuration.

As shown in FIG. 25, a number of Nodes 601 are shown, with each being either a 4 switch (Full H-Bridge) or 2-switch (Half H-bridge) configuration, or combinations thereof. A node 601 may be equipped with a battery cell(s) and/or super capacitor(s) energy storage elements, where such nodes may form one, two or more strings connected in series within a battery pack or super-capacitor bank. The system can operate in Direct Current (DC) and/or Alternating Current (AC) modes. In DC-input mode, the system operates as a multi-level charge converter. In DC-output mode, the system operates as a variable DC-DC converter. In the AC-input mode, the system may charge as a transformerless system. In AC-output mode, the system operates as a multilevel storage inverter. Several serial-strings may also be configured in parallel to enable charging from a multi-phase AC power supply or discharge into a multi-phase AC load.

Simultaneous Charging/Discharging using two strings: In FIG. 25, with switches 602 and 603 closed, and a power supply applied to the (A) terminals, then the top string is charged. With switches 604 and 605 closed, and a load applied to the (B) terminals, then the bottom string is discharged. The reverse process, charging the bottom string and discharging the top string is performed by opening 602, 603, 604, and 605 and closing switches 606, 607, 608, and 609.

Breaking the above configuration and putting the two strings in series is done by opening all other switches and closing switch 610. Combining of the two strings eliminate the simultaneous charge/discharge option but enable higher voltage input/output, faster charging or longer system run-time when discharging at a lower voltage output. Charging of combined strings is done by applying a power supply to the (A) terminals by closing switches 602 and 607. Discharging of combined strings is done by applying a load to the (B) terminal by opening 602, 607 and closing switches 605 and 608.

Figure 26:
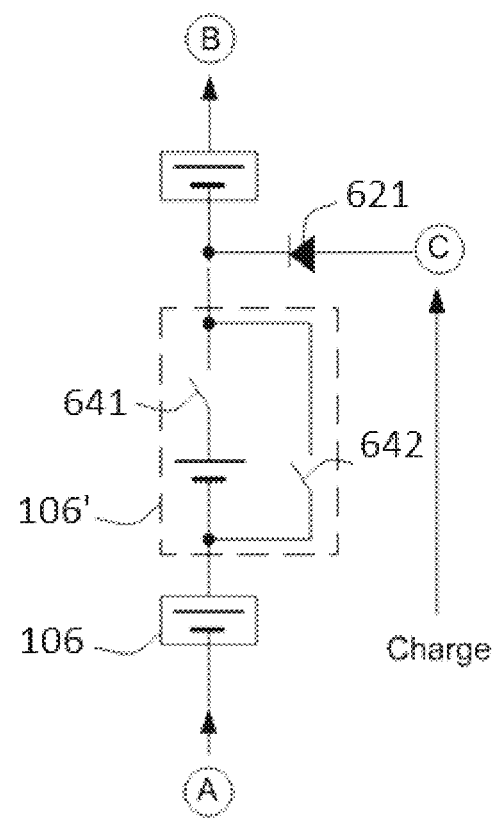
FIG. 26 is a diagram illustrating additional elements of the system of FIG. 25.
Figure 27:
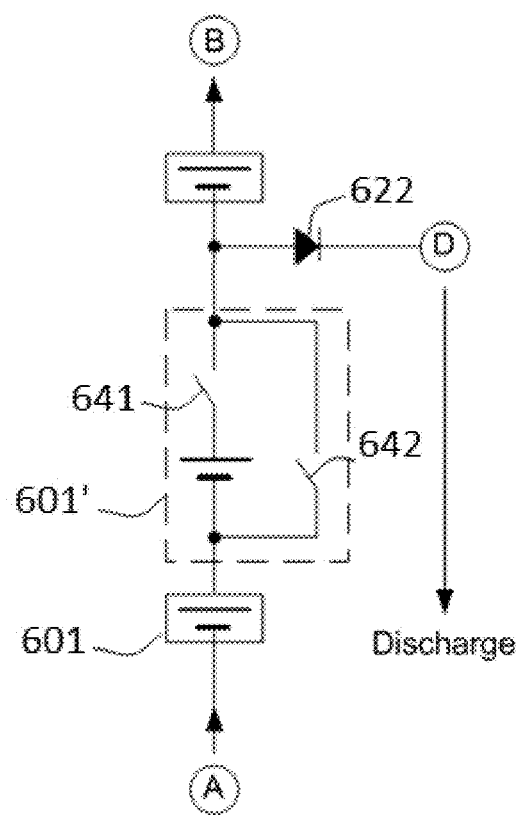
FIG. 27 is an alternate embodiment of the system of FIG. 26.

Another simultaneous charge/discharge option is shown in FIG. 26 and FIG. 27, where a number of Nodes 601 are cascaded in series forming one or more strings between terminals (A) and (B). Diode 621 is used for simultaneously charging or discharging the string while normal operations are applied between terminals (A) and (B). 601' shows an exploded view of the node 601 using a 2-switch or half H-bridge configuration, as an example.

Simultaneous Discharging and Charging of the same string using a Diode: FIG. 26 shows a string that is being discharged into a load applied between the terminals (A) and (B) and an external power source is applied to the charging terminal (C) charging the string through a diode 621. The charge point can be applied in a similar fashion, through a diode 621, anywhere in the string adjusting the charging voltage to operate at such insertion point.

Simultaneous Discharging of one string into two loads using a Diode: FIG. 27 shows a system that is being discharged into a load applied between the terminals (A) and (B) and another simultaneous discharge is performed through a diode 622 to another load applied to terminal (D). The discharge between terminals (A) and (B) can be either AC or DC while the discharge via terminal (D) is DC only. The discharge point can be applied in a similar fashion, though a diode 622, anywhere in the string allowing for a set voltage level to be drawn from the system depending on where it is connected within the string.

Figure 28:
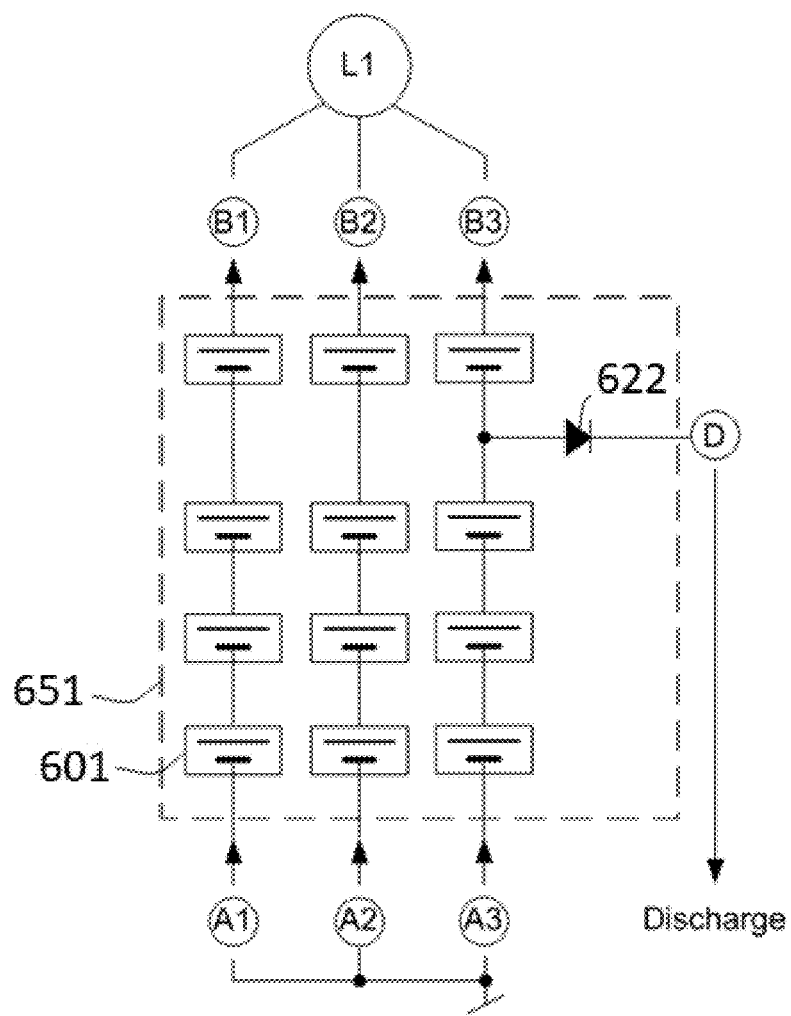
FIG. 28 is diagram illustrating an alternative simultaneous charge and discharge configuration.

FIG. 28 shows yet another Simultaneous Discharge example into two loads. In this case, a pack 651 forming a multistring system comprising cascaded nodes 601. The system is discharging from terminals (B1), (B2), and (B3) into a load (L1), e.g., a 3-phase AC motor, while also simultaneously discharging into another load through the discharge terminal (D) though diode 622.

Dynamic control of the technology charge and discharge process takes advantage of the individual cell-level control not available in present state-of-art systems using traditional battery management or supervisory systems for example. As such, a charge can be transferred from one system to another regardless of the State of Charge (SoC) of such system where two or more systems may be connected in series for higher voltage applications or in parallel for higher current applications where a lower charged system can charge a higher charged system for example.

Figure 29:
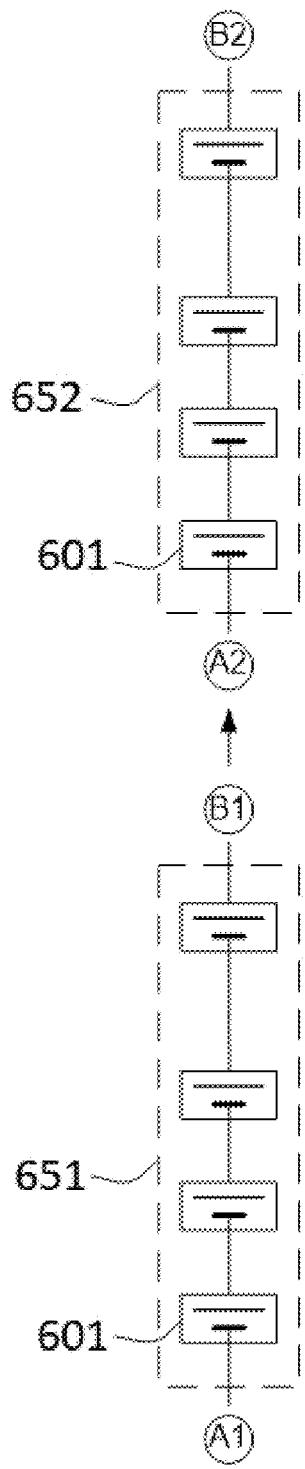
FIG. 29 is diagram illustrating a series charge or discharge configuration.

Dynamic Discharge Control of multiple packs in series: FIG. 29 shows two systems or packs 621 and 652 connected in series where the controller dynamically manages the combined voltage output. If, for example, the maximum output voltage between the terminals (A1) and (B1) forming pack 651 is 100V and the maximum output voltage between terminals (A2) and (B2) forming pack 652 are 100V the combined voltage would be 200V. If the controller sets the discharge voltage at 100V, the controller will dynamically select any nodes 601 across the entire system to provide a constant discharge voltage of 100V and select any nodes 601 within the system creating such voltage selecting only from the highest State-of-Charge (SOC) nodes 601. As such the system is self-balancing, equalizing and regulating the output voltage at the same time.

Figure 30:
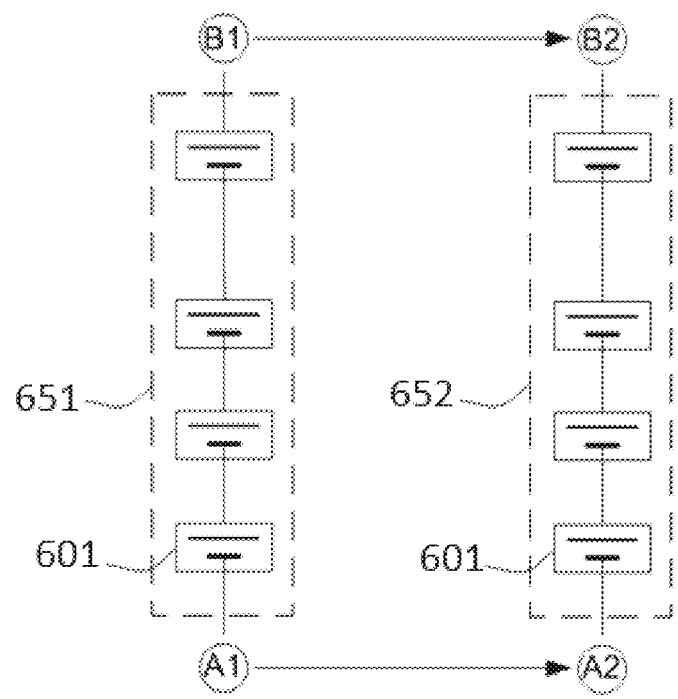
FIG. 30 is diagram illustrating a pack-to-pack charging configuration.

Dynamic Discharge and Charge control of packs in parallel: FIG. 30 shows two strings connected in parallel, where 651 may be used to charge 652 in a Pack-to-Pack (P2P) charging application, for example. In a traditional system, using one pack to charge the other would require the first pack 651 to be at a higher charge than the second pack 652. However, the dynamic node control of the present invention enable new options.

If the string between terminals (A1) and (B1) or pack 651 comprise lower State-of-Charge (SOC) nodes 601 and the string between terminals (A2) and (B2) or pack (P2) comprise a string of higher State-of-Charge (SOC) nodes 601 and because of the individual cell-level voltage monitoring and the dynamic charge/discharge and enable/disable control performed by the controller, each node in the higher-charged pack 652 can eliminate, or bypass, its fully charged cells in the string and thus allow the lower-charged pack 651 to be charged individually or the controller may form the appropriate voltage to charge multiple cells simultaneously in pack 652 from pack 651. This means that any lower charged cell in pack 652 is charged with a higher charged cell from pack 651. Pack 651 can also charge more than one cell in pack 652 at the same time or thus group several cells together for a higher voltage and then charge an equivalent number of multiple cells in pack 652 from pack 651 at the same time.

Although the invention has been described in detail with reference to particular examples and embodiments, the examples and embodiments contained herein are merely illustrative and are not an exhaustive list. Variations and modifications of the present invention will readily occur to those skilled in the art. The present invention includes all such modifications and equivalents. The claims alone are intended to set forth the limits of the present invention.

What is claimed is:

1. A reconfigurable energy storage system comprising: one or more energy modules comprising:
   a plurality of circuits interconnected to each other, each circuit having
   at least two input/output terminals, which can function as input or output terminals;
   an energy storage unit with a positive terminal and a negative terminal, either of which can be interposed between the input/output terminals;
   a switch module connected to said energy storage unit, and where the switch module provides parallel, series, and/or bypass connectivity for and enables the ability to reverse polarity in said energy storage unit, and enables the ability to simultaneously charge and discharge energy storage units within the system; and
   a control unit that monitors an operational state of the energy storage unit in the energy modules and controls the switches, to bypass, connect the energy storage unit in parallel, series, and/or change the polarity of said energy storage unit when connected with the plurality of circuits in accordance with the operational state, wherein the control unit determines a number of energy storage units available for use from the energy storage units in the plurality of circuits.

2. The reconfigurable energy storage system of claim 1 wherein the switch module comprises at least two switches and is based upon an inverted H-Bridge.

3. The reconfigurable energy storage system of claim 1 wherein the control unit monitors the state-of-charge, the state-of-health, state-of-life and the fault prediction of the energy storage system.

4. The reconfigurable energy storage system of claim 1 wherein the control unit monitors information about the state-of-charge, the state-of-health, state-of-life and the fault prediction of the energy storage system and employs said information to prioritize the usage of the energy storage units and balance the state-of-charge of the plurality of energy storage units within the energy storage system as the system is charged or discharged.

5. The reconfigurable energy storage system of claim 1 wherein each energy storage cell group is comprised of a string of energy storage unit arranged to meet a voltage output requirement.

6. The reconfigurable energy storage system of claim 1 wherein the control unit receives a voltage output requirement for a given output and configures the switch module in the plurality of energy storage circuits to form a circuit arrangement which outputs a voltage that meets the voltage output requirement for the given output.

7. The reconfigurable energy storage system of claim 1 wherein an auxiliary power source may be derived from the reconfigurable energy storage system to power control circuitry, monitoring circuitry, and other fixed voltage devices.

8. The reconfigurable energy storage system of claim 1 wherein the switch module is based upon an inverted Full- and/or Half-H-Bridge design and, when there is more than one energy module, the number of switches will be 2n or 4n, where n is the number of energy modules.

9. The reconfigurable energy storage system of claim 1 wherein the energy storage unit is selected from the group of battery cells, energy storage cells, fuel cells, and capacitors.

10. The reconfigurable energy storage system of claim 1 wherein the energy storage unit is a rechargeable system.

11. The reconfigurable energy storage system of claim 1 wherein the switch module is based upon an alternating polarity circuit having 2n and/or 2n+2 switches, where n is the number of energy storage units.

12. The reconfigurable energy storage system of claim 1 wherein the switch module is based upon an alternating polarity circuit having 2n+2 switches, where n is the number of energy storage units, there are two or more energy storage units, and the adjacent energy storage units are arranged to be of opposite polarity.

13. The reconfigurable energy storage system of claim 1 wherein the control unit configures the switch module in the plurality of energy storage circuits by determining a number of energy storage unit arranged in series are needed to meet the voltage output requirement and determining a number of energy storage unit groups which can be arranged in parallel to each other from the number of energy storage unit available for use, where each energy storage cell group is comprised of a string of energy storage units arranged in series that meet a voltage output requirement.

14. The reconfigurable energy storage system of claim 1 wherein the control unit receives a number of parallel cell groupings and configures the switch module in the plurality of energy storage circuits to form a circuit arrangement that minimizes the number of energy storage units available for use that are bypassed in the circuit arrangement.

15. The reconfigurable energy storage system of claim 1 wherein the control unit detects and isolates faults by controlling the plurality of switches to isolate the faulted cell where the fault may be caused by detected or predicted extremes including temperature, voltage, current, state of charge, state of health, state-of-life, cell expansion, off-gassing, or short or open circuit conditions where these conditions are known by the control system.

16. A power management system which incorporates the reconfigurable energy storage system of claim 1 and wherein the control system detects the charging source and arranges the plurality of cells to accommodate charging where the charging source may be of alternating or direct current variety including one or more phases at a range of voltages which spans from the equivalent voltage of a single energy storage unit up to the sum of the voltages of the series connected energy storage units.

17. A power management system which incorporates the reconfigurable energy storage system of claim 1 and wherein the control system detects the load and configures the plurality of cells to accommodate the load requirements which may be of alternating or direct current type including one or more phases at a range of voltages which spans from the equivalent voltage of a single energy storage unit up to the sum of the voltages of the series connected energy storage units.

18. A power management system which incorporates the reconfigurable energy storage system of claim 1 and wherein the charging source is selected from a group consisting of grid power systems consisting of a variety of voltages and phases, alternative energy sources including wind power, solar power, thermoelectric, or nuclear, or other wireless charging sources including inductive, resonant inductive, or radio frequency.

19. A power management system which incorporates the reconfigurable energy storage system of claim 1 and wherein the load is selected from a group consisting of applications which involve the use of secondary batteries including a plurality electric vehicles, grid and backup storage units, aerospace applications, portable equipment, and consumer electronic devices.

20. The reconfigurable battery system of claim 1 connected to one or more other reconfigurable battery systems of claim 1, wherein the control units of each system allows for co-operative energy exchange between each system.

* * * * *